US009310009B2

(12) United States Patent
Cooley

(10) Patent No.: US 9,310,009 B2
(45) Date of Patent: Apr. 12, 2016

(54) GREASE DELIVERY RECEIVER AND NOZZLE HAVING PRESSURIZATION LOCKOUT AND BLEED DOWN CAPTURE

(71) Applicant: Robert Charles Cooley, Springville, UT (US)

(72) Inventor: Robert Charles Cooley, Springville, UT (US)

(73) Assignee: Dean Edward Mackey, Springville, UT (US)

( * ) Notice: Subject to any disclaimer, the term of this patent is extended or adjusted under 35 U.S.C. 154(b) by 0 days.

(21) Appl. No.: 14/353,166

(22) PCT Filed: Oct. 19, 2012

(86) PCT No.: PCT/US2012/061220
§ 371 (c)(1),
(2) Date: Apr. 21, 2014

(87) PCT Pub. No.: WO2013/059748
PCT Pub. Date: Apr. 25, 2013

(65) Prior Publication Data
US 2014/0261807 A1   Sep. 18, 2014

Related U.S. Application Data

(60) Provisional application No. 61/701,992, filed on Sep. 17, 2012.

(51) Int. Cl.
| *F16L 37/36* | (2006.01) |
| *E02F 9/22* | (2006.01) |
| *F16L 37/34* | (2006.01) |
| *F16L 37/44* | (2006.01) |

(52) U.S. Cl.
CPC ............... *F16L 37/36* (2013.01); *E02F 9/2275* (2013.01); *F16L 37/34* (2013.01); *F16L 37/44* (2013.01); *Y10T 137/87933* (2015.04); *Y10T 137/87949* (2015.04); *Y10T 137/87965* (2015.04); *Y10T 137/9029* (2015.04)

(58) Field of Classification Search
CPC ........... F16L 37/34; F16L 37/44; F16L 37/36; F16L 37/46; Y10T 137/87965; Y10T 137/87973; Y10T 137/87941; E02F 9/2275
USPC ........................................ 137/614.06, 614.03
See application file for complete search history.

(56) References Cited

U.S. PATENT DOCUMENTS

| 7,306,007 B2 * | 12/2007 | Matsumoto ............... 137/614.06 |
| 7,708,029 B2 * | 5/2010 | Kitagawa et al. ........ 137/614.03 |

* cited by examiner

*Primary Examiner* — Kevin Lee
(74) *Attorney, Agent, or Firm* — Angus C. Fox, III

(57) ABSTRACT

A grease and lubricating oil line coupler includes a nozzle and a receiver which can be intercoupled for grease or lubricating oil delivery. Each component has a normally closed, easily-cleanable, flush-faced mating surface, which prevents the entrance of contaminants into the free ends thereof when decoupled. The nozzle has a handle-operated internal valve with an interlock that is controlled by a quick disconnect slidable collar, which prevents the release of lubricants from the nozzle unless it is coupled to the receiver. Only when the nozzle and receiver are interconnected can the valve be opened; only when the valve is closed can the nozzle be decoupled from the receiver. A high-pressure bleed-off feature returns high-pressure excess lubricant within the coupler to the lubricant storage tank when the handle of the nozzle is returned to its OFF position prior to decoupling it from the receiver.

20 Claims, 22 Drawing Sheets

GREASE DELIVERY RECEIVER AND NOZZLE HAVING PRESSURIZATION LOCKOUT AND BLEED DOWN CAPTURE

RELATED APPLICATION DATA

This is a national stage application of PCT application No. PCT/US12/61220, that was filed on Oct. 19, 2012, and which has a priority claim based on the filing of U.S. Provisional Application No. 61/701,992 on Sep. 17, 2012.

BACKGROUND OF THE INVENTION

1. Field of the Invention

This invention relates generally to pressurized grease or lubrication delivery systems for heavy construction equipment, earth-moving equipment and other equipment having on-board grease reserves, as well as the ability to safely couple and uncouple the coupler while under line pressure.

2. Description of the Prior Art

Quick-coupling devices are used extensively for transferring fuels and lubricants from supply reservoirs to tanks on self-propelled heavy construction and earth-moving equipment. In addition, there is also a frequent need to couple and decouple pressurized hydraulic lines.

U.S. Pat. No. 2,625,410 to Ernest W. Crowley, titled COUPLING, discloses a quick-disconnect coupling for fluid conduits having movable poppets which close the two separate parts of the conduit to eliminate loss of pressurized or flammable fluids during connection or disconnection.

U.S. Pat. No. 2,675,829 to Carlos B. Livers, titled QUICK-DISCONNECT COUPLING WITH SELECTIVELY OPERABLE VALVE, discloses a coupling having check valves for automatically sealing hydraulic lines when the coupling is disconnected. The check valves can also be opened and closed while the coupling is connected in order to control flow of fluid through the coupling.

U.S. Pat. No. 3,129,919 to Jack M. Evans, titled VALVED QUICK COUPLER, discloses a quick coupler in which one of the separable parts has a valve which is closed when the coupler is uncoupled and opened when the two parts are coupled.

The process of transferring pressurized grease or other less viscous lubricants from a supply reservoir to a storage reservoir on board heavy construction and earth-moving equipment presently requires the depressurization of transfer lines on both the receiver side and supply nozzle side before the nozzle is coupled to the receiver. Depressurization typically involves a bleed-off of pressurized lubricant. Not only is the bleed-off process time consuming, it also results in the discharge of costly petroleum-based lubricant that is a potential environmental pollutant.

Despite the significant useful features disclosed in the prior art relating to quick-disconnect couplers, the prior art does not show a coupler having a flow valve which cannot be actuated while the coupler is in a state of disconnection, which permits connection and disconnection operations while the lines are pressurized without loss of fluid, and which has flush face mating surfaces on both male and female portions of the connector which facilitate cleaning of the mating surfaces so as to avoid contamination of the fluid after coupling occurs.

SUMMARY OF THE INVENTION

The present invention is an enhancement to the invention of U.S. patent application Ser. No. 13/277,136 (U.S. Pat. Publication No. 20120090713 A1), which overcomes the heretofore-described deficiencies of the prior art by providing a high-pressure coupler for pressurized delivery of grease and other lubricating fluids. The coupler includes two interconnectable components: namely a receiver and a nozzle. The receiver and nozzle are each equipped with a normally closed, sealed poppet, which not only prevents the entrance of dirt and other contaminants into that component when they are uncoupled, but also provides an easily-cleanable, flush-faced mating surface on that component. The poppet on the receiver is movable and spring biased, while the poppet of the nozzle, though immovable, if fitted with a spring-biased, slidable annular poppet seat. Furthermore, the nozzle has a handle-controlled internal ball valve with a lockout coupled to a quick disconnect system which prevents rotation of the handle and the concomitant release of lubricants from the nozzle component unless the latter is coupled to the receiver component. As the forward end of the nozzle slides over a free end of the receiver, the receiver poppet is simultaneously pushed back into the receiver body by the nozzle poppet while the slidable annular poppet seat is pushed into the nozzle body, thereby opening a flow path through the receiver and a partial flow path through the nozzle. The nozzle has a circle of ball bearings that align with a circumferential locking groove when the nozzle slides onto the receiver. As a locking collar on the nozzle slides forward from an uncoupled position, it not only locks the ball bearings within the locking groove—which locks the nozzle to the receiver, but also unlocks the handle. When the handle is unlocked, the handle can be rotated about 90 degrees. The handle is rigidly affixed to a shaft which is coupled to a rotatable internal ball valve. As the handle and shaft are rotated, the ball valve opens, thereby completing the flow path through the nozzle so that grease or other lubricating fluid can flow through the nozzle, into the receiver, and then into a storage tank.

The present invention adds a high-pressure bleed-off feature, which returns high-pressure excess lubricant within the coupler to the lubricant storage tank when the handle of the nozzle is returned to its OFF position prior to decoupling it from the receiver. Bleed-off of excess lubricant can be caused by the contraction of flexible high-pressure hoses following depressurization of the system, and by entrapped gases within grease remaining in the nozzle following pressurization cut-off. The latter scenario is more likely to occur when system and environmental temperatures are elevated. In addition, a new receiver having a pair of tandem poppets, is also provided. A first spring-biased poppet, which seals the entrance to the receiver, is opened during by the nozzle poppet during a coupling operation. A second spring-biased poppet is forced open by the flow of pressurized grease or other lubricant. The second poppet closes when the flow of grease is terminated, thereby preventing loss of pressurization in a lubrication system—even during the actual decoupling of the nozzle from the receiver.

PREFERRED EMBODIMENT OF THE INVENTION

The new grease coupler for pressurized delivery of grease and other lubricating fluids will now be described in detail, with reference to the attached drawing figures. Item numbers 100 and 100 plus a two-digit integer refer to the single-poppet receiver; item numbers 300 and 300 plus a two-digit integer refer to the tandem-poppet receiver and its components; and item numbers 200 and 200 plus a two-digit integer refer to the nozzle and its components.

Figure 1:
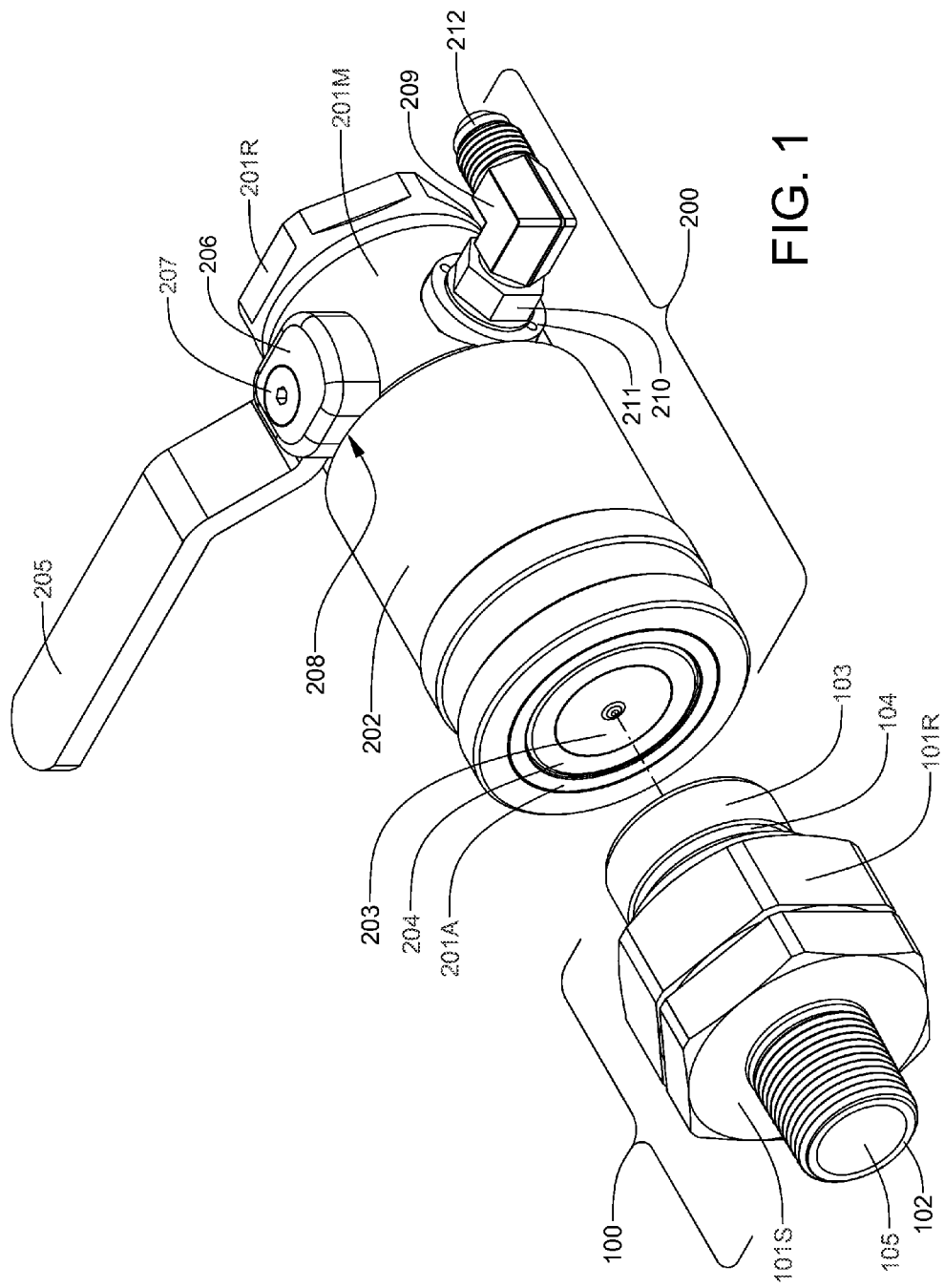
FIG. 1 is an isometric view of new grease coupler components, to wit, a single-poppet receiver and a nozzle having pressurization lockout and bleed-down capture, in an uncoupled configuration.
Figure 2:
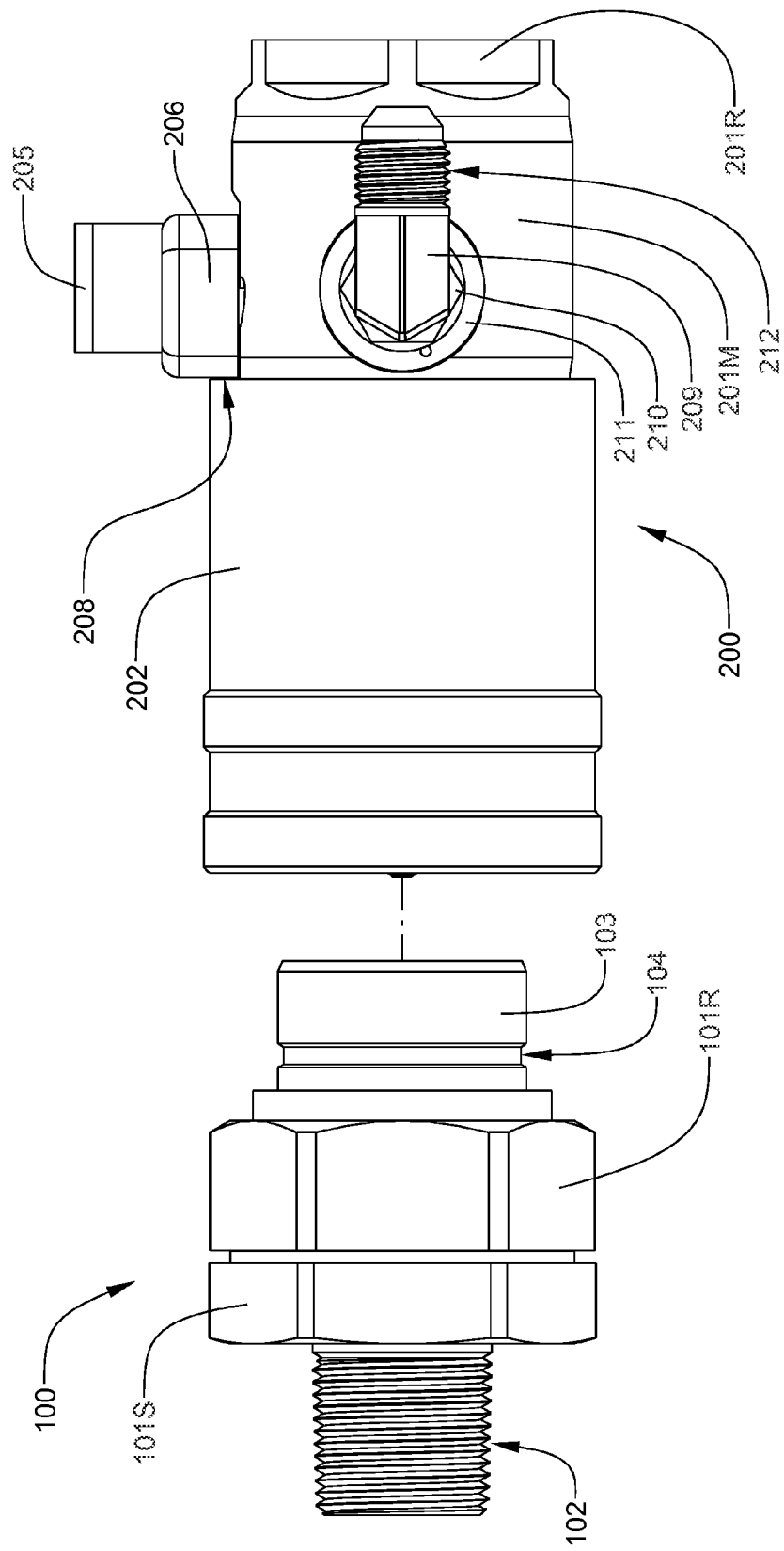
FIG. 2 is an elevational view of the new grease coupler components of FIG. 1, in an uncoupled configuration.

Referring now to FIGS. 1 and 2, the coupler includes two interconnectable components: namely a first embodiment receiver 100 and a nozzle 200. The first embodiment receiver 100 has a two part body which includes a receiving portion 101R and a securing portion 101S. The securing portion 101S is equipped with a male pipe fitting 102 that can screwed into the female pipe fitting at the end of a high-pressure flexible hose, high-pressure metal line, or storage tank. The receiving portion 101R, on the other hand, has a cylindrical receiving extension 103, that is equipped with an annular circumferential locking groove 104, which enables the nozzle 200 to lock on to the cylindrical receiving extension 103. The securing portion 101S is threadably secured to the receiving portion 101R. Together, they form a flow-through internal chamber. The exit 105 from the internal chamber passes through the male pipe fitting 102.

Still referring to FIGS. 1 and 2, the nozzle 200 is equipped with an anterior body portion 201A, a middle body portion 201M, and a rear body portion 201R. The rear body portion 201R, which is couplable to a grease supply line, is at the entrance end of the nozzle 200. A two-piece locking collar 202 slides over the exterior of the anterior body portion 201A, while a generally cylindrical nozzle poppet head 203 is coupled to a nozzle poppet shaft (not shown in this view) that is rigidly secured within the anterior body portion. A spring-biased, slidable annular poppet seat 204 completely surrounds the nozzle poppet head 203. A handle 205 and interlock/rotation limiter 206 are rigidly secured to a rotatable valve actuator shaft (see the cutaway view of FIG. 6) with a handle securing screw 207. The rotatable valve actuator shaft is, in turn, coupled to a rotatable ball valve (also not visible in this view) within the middle body portion 201M. Rotation of the handle 205 and the internal ball valve allows grease to flow from the entrance end of the nozzle 200 to the exit end thereof. The interlock/rotation limiter 206, which is an eccentric device, prevents the handle 205 and the coupled ball valve from being rotated when the nozzle 200 is not coupled to the receiver 100 and insufficient clearance exists between the rear edge 208 of the locking collar 202 and the interlock/rotation limiter 206. It will be noted that the nozzle poppet 203, in combination with the annular poppet seat 204 and the anterior body portion 201A, form a generally flush face mating surface, which is easily cleanable. A standard right-angle hydraulic fitting 209 provides an outlet for lubricant bleed-down, once the handle 205 has been rotated from an OPEN position to a CLOSED position. The right angle fitting 209, which includes a cinch nut 210, is screwed into a bleed-seal-tensioner insert 211 that is threadably installed within the wall of the middle body portion 201M. Lubricant entering the right-angle fitting 209 is directed to the storage tank via a flexible line (not shown) that is threadably connected to the threaded end 212 of the right-angle fitting 209. How bleed-down occurs will be clear from the cut-away views of the coupler assembly.

Figure 3:
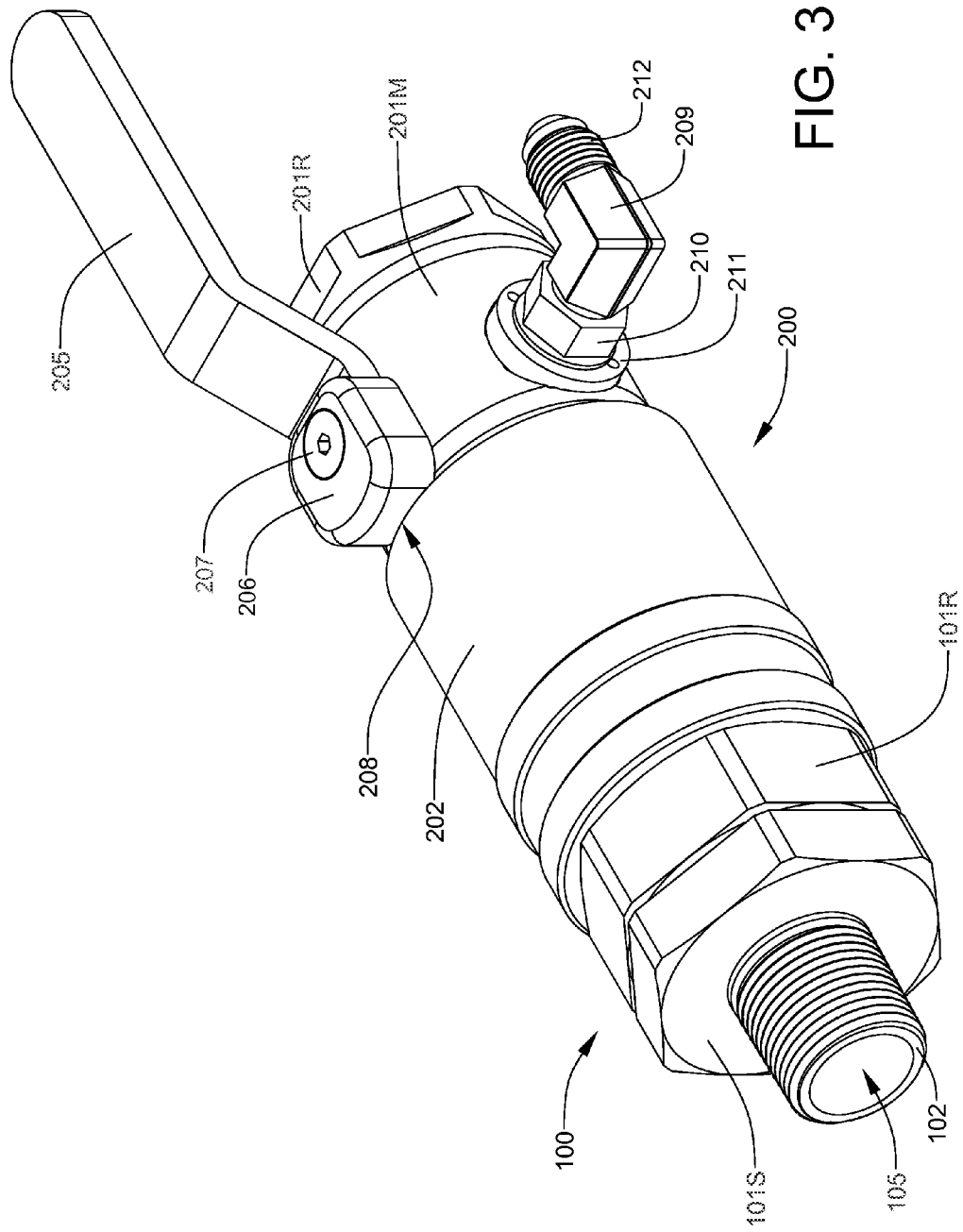
FIG. 3 is an isometric view of the new grease coupler components of FIG. 1 in a coupled configuration.
Figure 4:
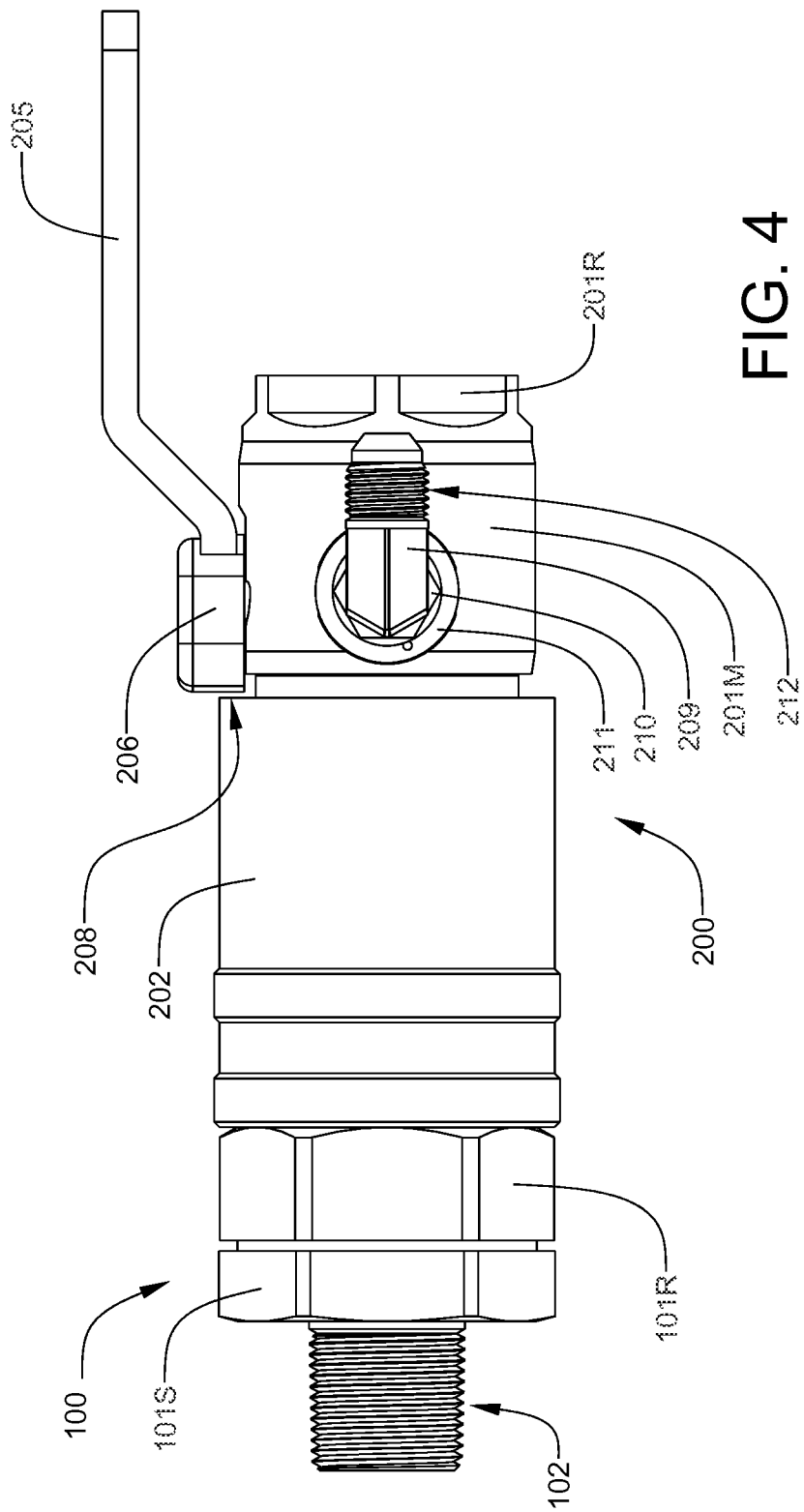
FIG. 4 is an elevational view of the new grease coupler components of FIG. 1, in a coupled configuration.

Referring now to FIGS. 3 and 4, the receiver 100 and nozzle 200 have been coupled together. Once the cylindrical receiving extension 103 has been inserted a sufficient distance into the anterior end of the nozzle 200, the locking collar 202 can be slid forward, thereby enabling the handle 205 to be turned to its ON position.

Figure 5:
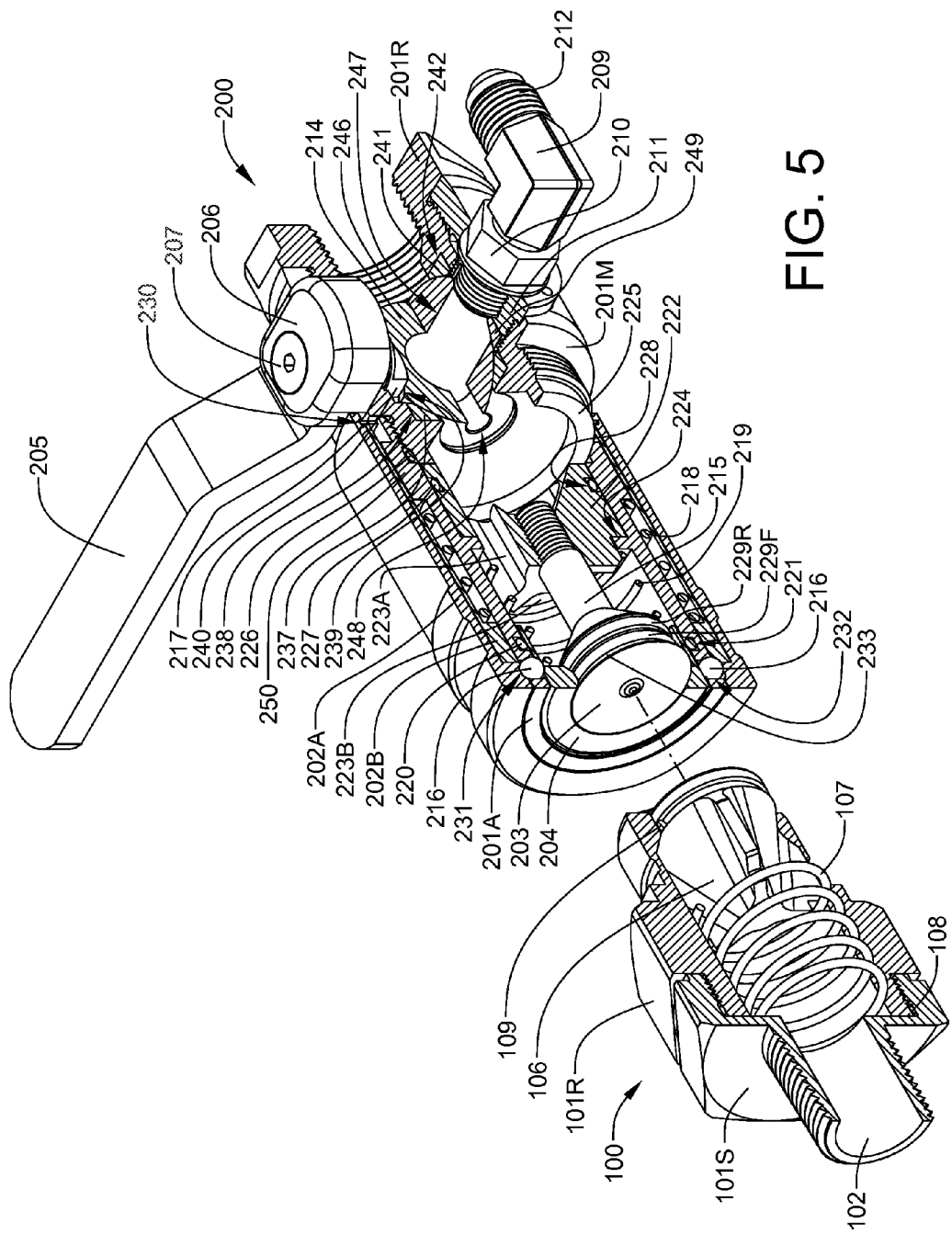
FIG. 5 is a cut-away/cross-sectional isometric view of the uncoupled grease coupler components of FIG. 1, with the cut taken through the central axes of the receiver and nozzle.
Figure 6:
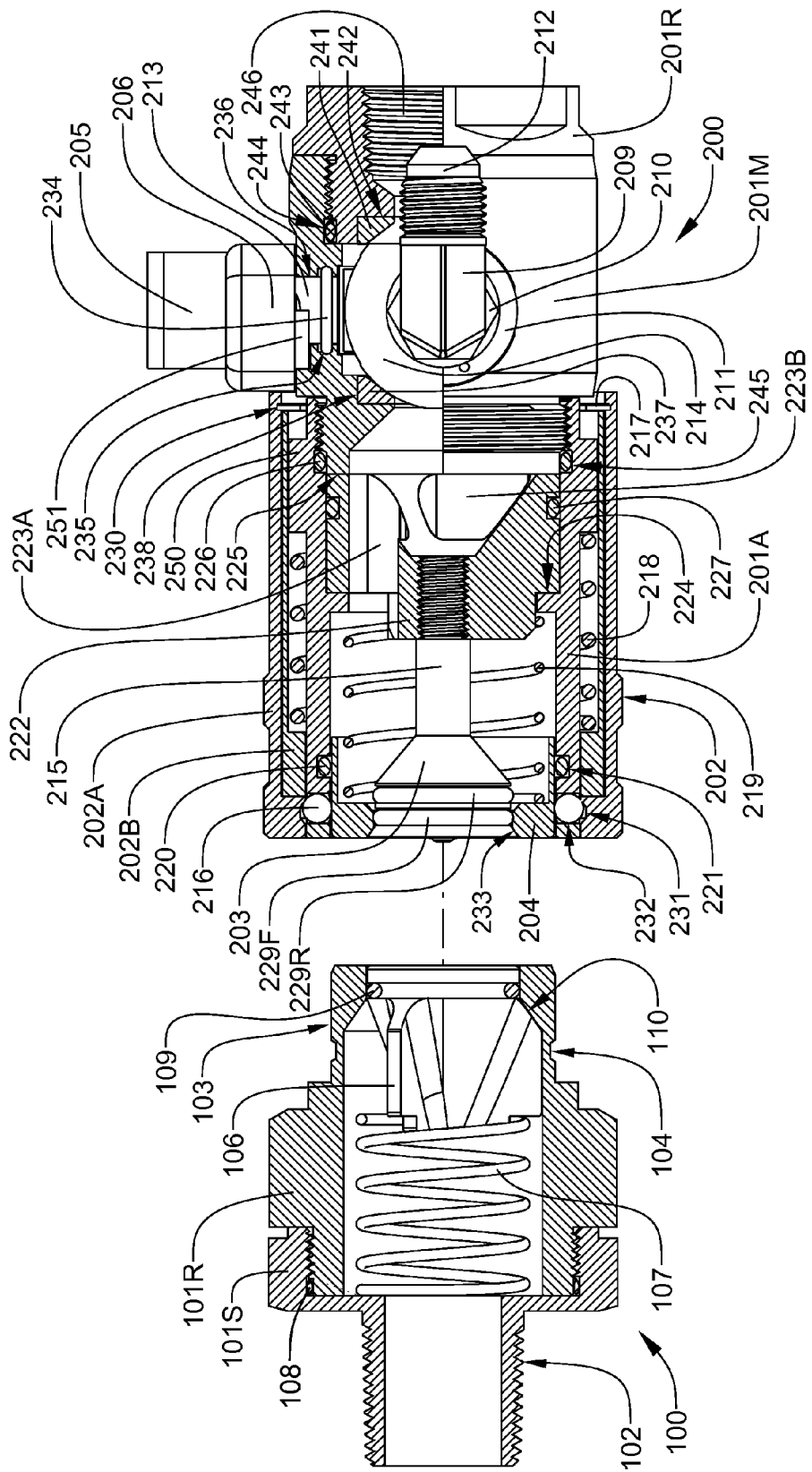
FIG. 6 is a cut-away/cross-sectional elevational view of the uncoupled grease coupler components of FIG. 1, with the cut taken through the central axes of the receiver and nozzle.

Referring now to FIGS. 5 and 6, the receiver 100 and nozzle 200 are shown uncoupled in a cut-away, cross-sectional view. The receiver poppet 106 and internal receiver poppet biasing spring 107 have not been sectioned, while the receiver body O-ring 108, a receiver poppet O-ring 109, the receiving portion 101R and securing portion 101S of the receiver body are shown in cross-sectional format. The receiver poppet 106 and the internal biasing spring 107 are installed within the receiver 100 before the receiving portion 101R is threadably secured to the securing portion 101S. It will be noted that the receiver body O-ring 108 seals the joint between the receiving portion 101R and the securing portion 101S. The internal biasing spring 107 applies pressure against the receiver poppet 106 so that the receiver poppet O-ring 109 deforms and seals the entrance of the receiver 100 when it is not coupled to the nozzle 200. It will also be noted that the receiver poppet 106 is biased by the spring 107 against a conical surface 110 near the entrance of the receiving portion 101R.

Focusing now on the nozzle 200 of FIGS. 5 and 6, only the handle 205, the interlock/rotation limiter 206, the valve actuator shaft 213, the valve ball 214, the nozzle poppet head 203, the nozzle poppet shaft 215, and a plurality of steel latching balls 216 have not been sectioned. All other nozzle components are shown in cross-sectional format. The locking collar 202 includes an anodized aluminum outer portion 202A and a zinc-plated steel inner portion 202B, which is better able to withstand pressure exerted on the steel latching balls 216, without deformation, when the nozzle 200 is coupled to the receiver 100 and the system is pressurized with grease at around 2000 pounds per square inch. The outer and inner portions 202A and 202B of the locking collar 202 are held together with a circumferential internal snap ring 217, which also limits the forward travel of the locking collar 202. The locking collar 202 is forward biased by a collar biasing coil spring 218, while the slidable annular poppet seat 204 is forward biased by a seat biasing coil spring 219. An anterior body O-ring 220, that fits within an internal O-ring groove 221 of the anterior body portion 201A, not only seals the joint between the slidable annular poppet seat 204 and the anterior body portion 201A when the nozzle 200 is decoupled from the receiver 100, but also seals the joint between the receiving extension 103 and the anterior body portion 201A when the nozzle 200 and the receiver 100 are coupled together. The nozzle poppet shaft 215 is threadably secured to a spindle 222, which incorporates three flow through passages 223A, 223B and 223C that are equally-radially spaced about the spindle's central axis. Only two of passages, 223A and 223B, are visible in the views of FIGS. 5 and 6. The third passage, 222C, has been cut off in the cross section. The spindle 222 is secured between an inward-facing interior flange 224 of the anterior body portion 201A and a front face 225 of the middle body portion 201M. The middle body portion 201M is threadably secured to the anterior body portion 201A. The joint between the anterior body portion 201A and the middle body portion 201M is sealed with a middle-body front O-ring 226.

Figure 17:
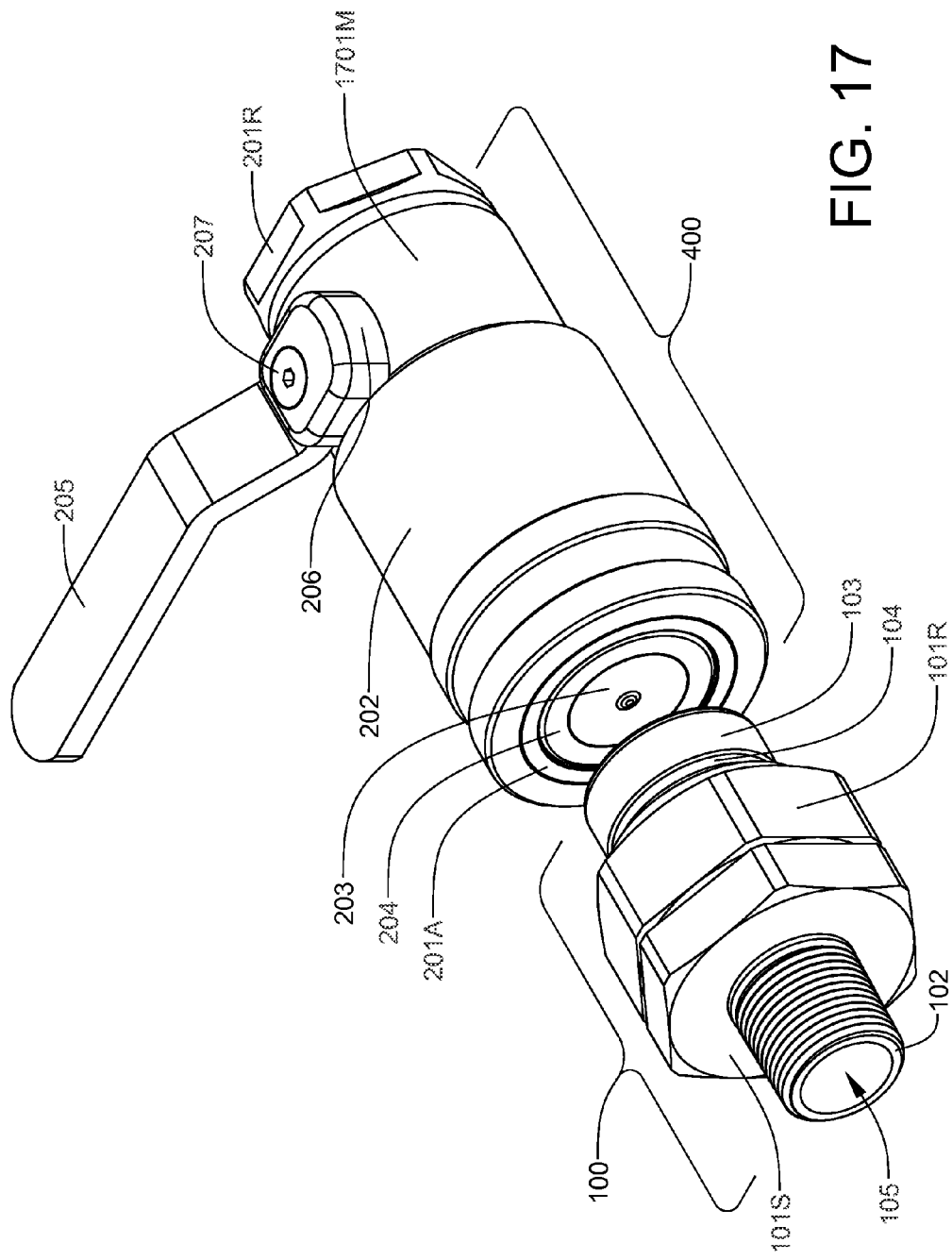
FIG. 17 is an isometric view of an uncoupled single poppet receiver and a nozzle without bleed-down capture.
Figure 18:
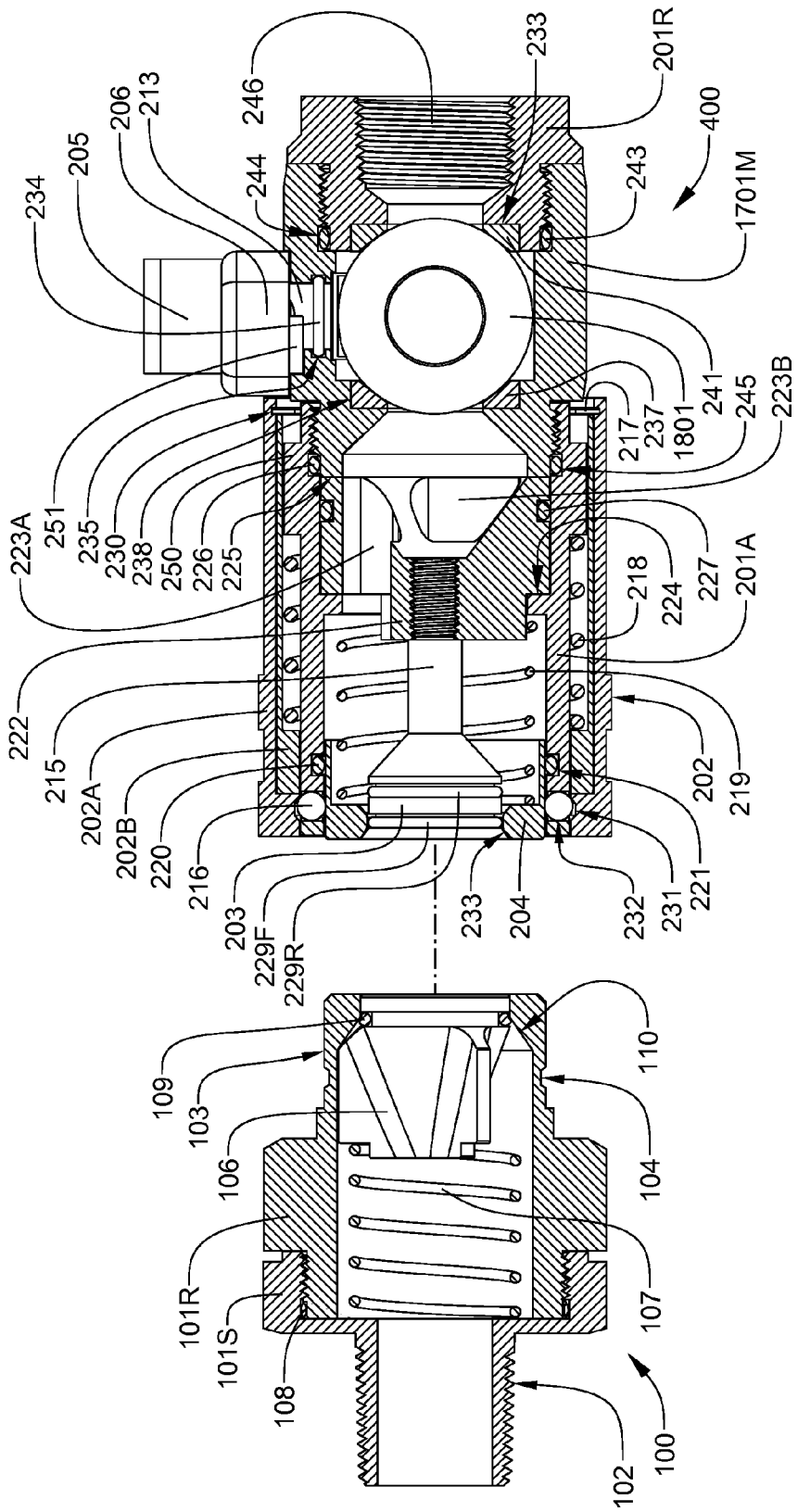
FIG. 18 is a partial cut-away, partial cross-sectional view, taken through the central axes of the uncoupled receiver and nozzle of FIG. 17.
Figure 19:
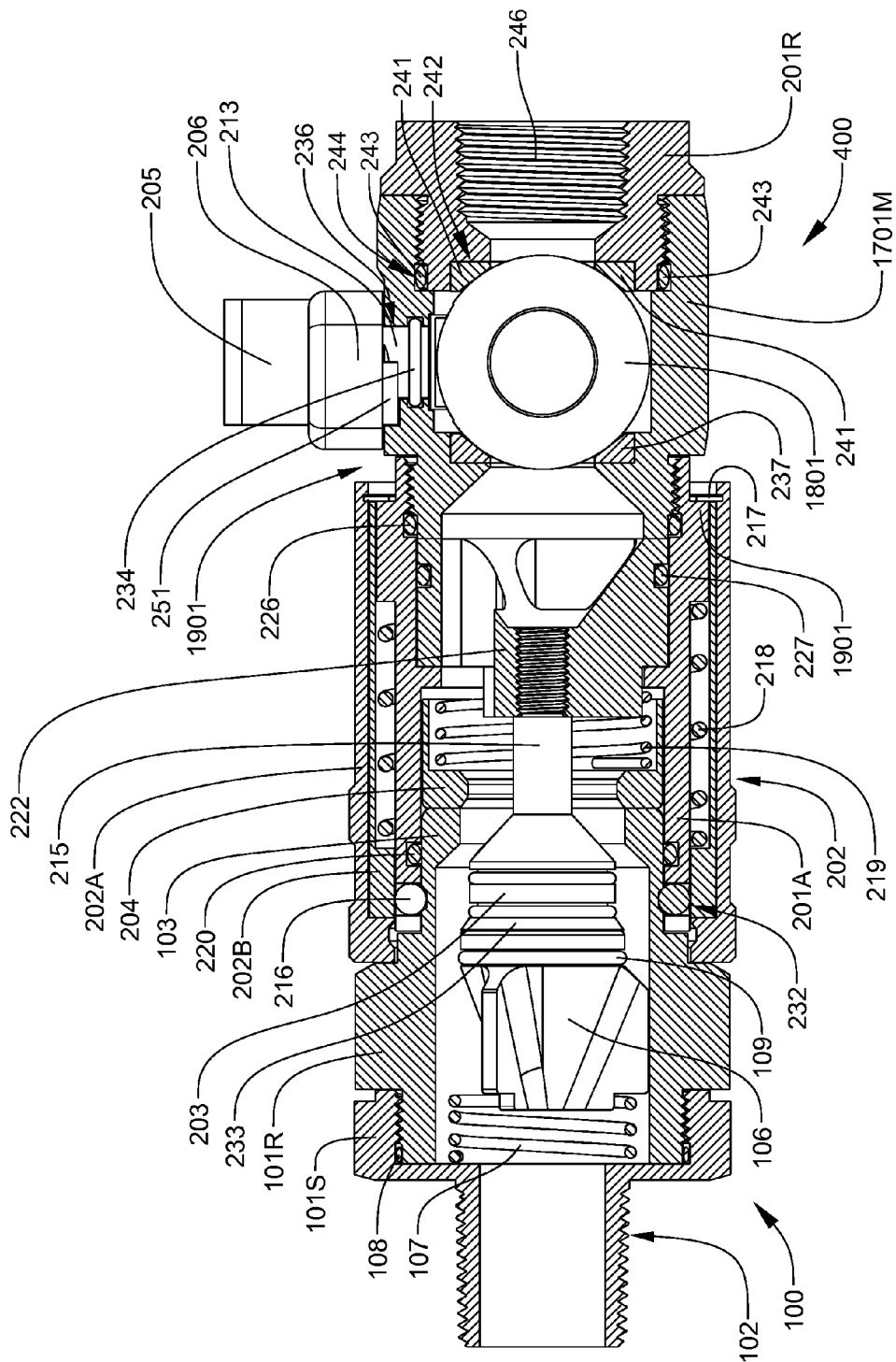
FIG. 19 is a partial cut-away, partial cross-sectional view, taken through the central axes of the intercoupled receiver and the nozzle of FIG. 17, with the actuator handle in the "OFF" position.
Figure 20:
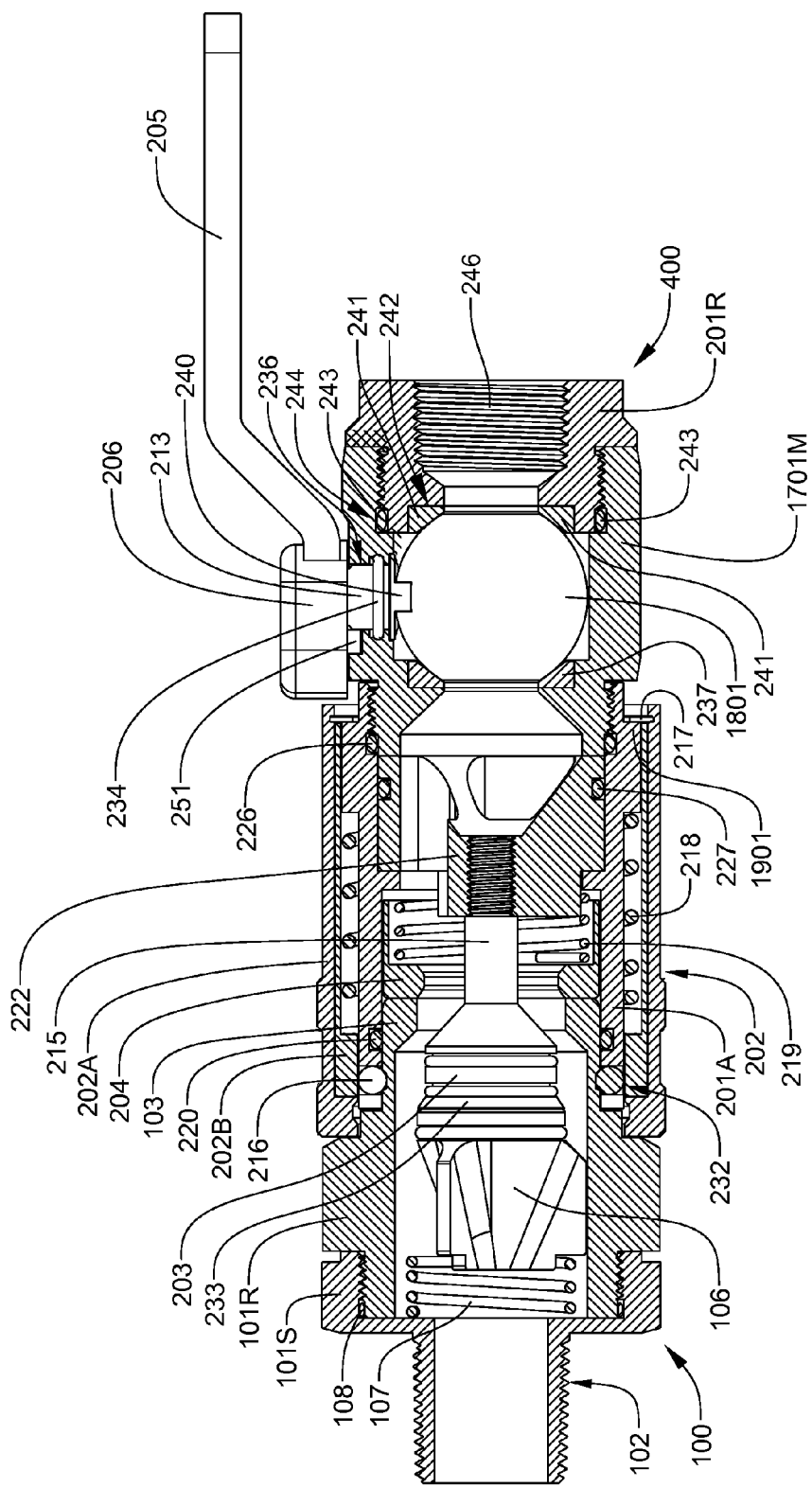
FIG. 20 is a partial cut-away, partial cross-sectional view, taken through the central axes of the intercoupled receiver and the nozzle of FIG. 17, with the actuator handle in the "ON" position.
Figure 21:
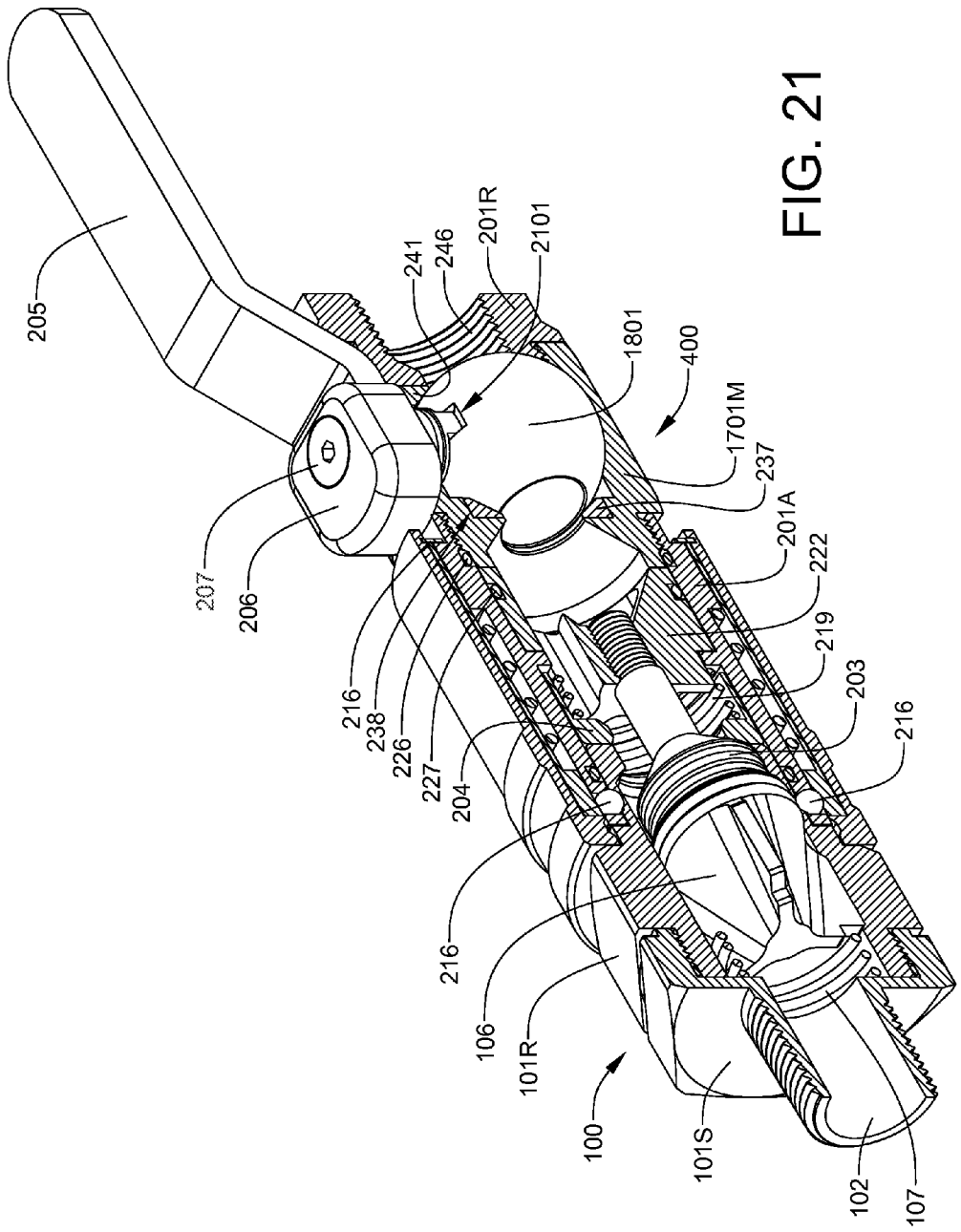
FIG. 21 is an isometric, partial cut-away, partial cross-sectional view of the coupled receiver and nozzle of FIG. 17, with the actuator handle in the "ON" position.

Still referring to FIGS. 5 and 6, the anterior portion of the nozzle is preferably assembled in the following sequence. A spindle O-ring 227 is installed within the spindle O-ring groove 228 on the spindle 222, after which the spindle 222 is inserted into the rear of the anterior body portion 201A. The purpose of the spindle O-ring 227 is not to seal any joint, but rather to hold the spindle 222 firmly in place within the anterior body portion 201A during assembly. A front poppet head O-ring 229F and a rear poppet head O-ring 229R are installed within the O-ring grooves in the poppet head 203. The anterior body O-ring 220 is then installed within the internal O-ring groove 221 of the anterior body portion 201A. Next, the slidable annular poppet seat 204 and the seat biasing coil spring 219 are installed in the front of the anterior body portion 201A. Next, the nozzle poppet shaft 215 is threadably secured to the spindle 222, preferably with thread locking compound. As the external threads at the end of the nozzle poppet shaft 215 engage the internally threaded aperture 1701 (please refer to FIG. 17) of the spindle 222, the slidable annular poppet seat 204 is urged rearward, thereby compressing the seat biasing coil spring 219. Next, the collar biasing coil spring 218 is installed over the front end of the anterior body portion 201A. Then, the two-piece locking collar 202 is slid over the forward end of the anterior body portion 201A, compressing the collar biasing coil spring 218. With the collar biasing coil spring 218 in a state of compression, the circumferential internal snap ring 217 is installed in the internal groove 230 of the outer portion 202A of the two-piece locking collar 202. Next, the two-piece locking collar is moved rearward so that the inner annular latching groove 231 in the outer portion 202A of the two-piece locking collar 202 is aligned with the latching ball apertures 232 in the anterior body portion 201A. Then the slidable annular poppet seat 204 is moved rearward to expose the latching ball apertures 232, and the steel latching balls 216 are installed therein. The slidable annular poppet seat 204 is then permitted to slide forward, thereby trapping the steel latching balls 216. Forward movement of the slidable annular poppet seat 204 is limited by the conical flare 233 at the forward end of the nozzle poppet 203.

Still referring to FIGS. 5 and 6, the valve ball 213, the valve actuator shaft 213, the handle 205, and the interlock/rotation limiter 206 are installed within the middle body portion 201M in the following sequence. An actuator shaft O-ring 234 is installed within an O-ring groove 235 in an actuator shaft aperture 236. The valve actuator shaft 213 is then installed within the actuator shaft aperture 236 from inside the middle body portion 201M, and the interlock/rotation limiter 206 and handle 205 are secured to the valve actuator shaft 213 with the handle securing screw 207. Next, a front annular sealing ring 237 is installed within the sealing ring recess 238 of the middle body portion 201M. Then, with the handle 205 turned to the OFF position, the valve ball 214 is rocked into position, with a slot 239 in the valve ball 214 engaging a blade 240 at the lower end of the actuator shaft 213. A rear annular sealing ring 241 is then inserted in the sealing ring recess 242 of the rear body portion 201R, a rear-body O-ring 243 is installed in the annular recess 244 within the middle body portion 201M, and the rear body portion is screwed into the rear of the middle body portion 201M. Thus, the rear body portion 201R functions as a ball valve component retainer. The middle-body O-ring 226 is then installed in the annular recess 245 within the anterior body portion 201A, and the middle body portion 201M is screwed into the rear of the anterior body portion 201A, thereby trapping the spindle 222. The grease entrance port 246, which is within the rear body portion 201R, has a female pipe thread, which enables it to be coupled to a grease line (not shown). It will be noted that the valve ball 214 has a major flow-through aperture 247, through which grease flows from the grease entrance port 246 and into the middle body portion 201M and into the anterior body portion 201A when the handle 205 is in the open position. In FIGS. 5 and 6, the handle 205 is in the closed position and the major flow-through aperture 247 is perpendicular to the flow path. A minor bleed-down aperture 248 is perpendicular to the major flow-through aperture 247. When the handle 205 is in the closed position, the minor bleed-down aperture 248 connects the interior chambers of the middle body portion 201M and the anterior body portion 201A to the major flow-through aperture 247, so that any pressurized grease or lubricant within those interior chambers is transferred to the right angled fitting 209, from whence it is transported by a bleed-down line (not shown) back into the grease or lubricant supply tank (also not shown). A side annular sealing ring 249 seals joint between the valve ball 214 and the bleed-seal-tensioner insert 211. The bleed-seal-tensioner insert 211 is screwed into the wall of the middle body portion 201M using a spanner pin wrench. A cyanoacrylic adhesive, such as Loctite®, is used to secure the bleed-seal-tensioner insert with the desired pressure loading against the side annular sealing ring 249.

Figure 7:
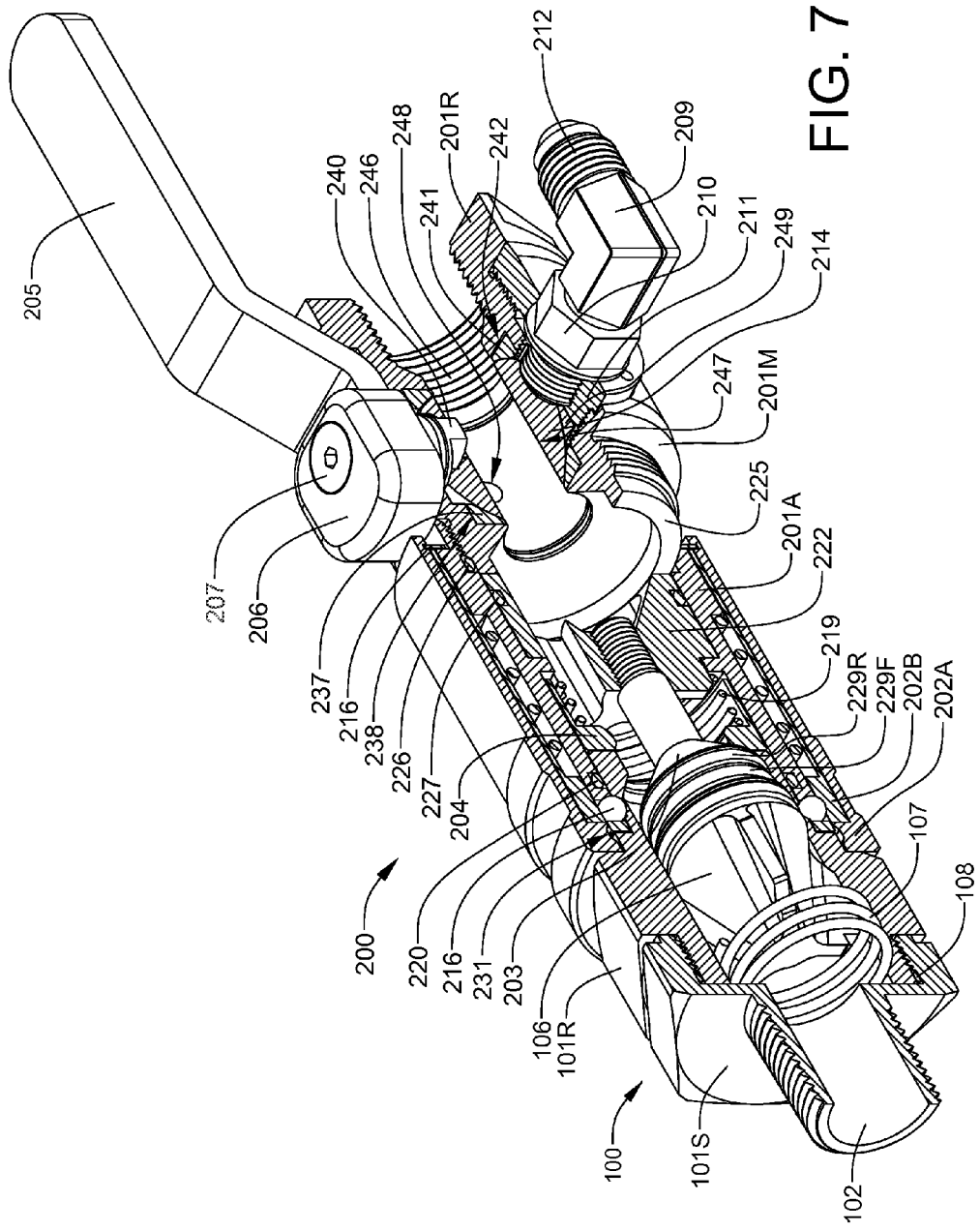
FIG. 7 is a cut-away/cross-sectional isometric view of the coupled grease coupler components of FIG. 1, with the cut taken through the central axes of the receiver and nozzle.
Figure 8:
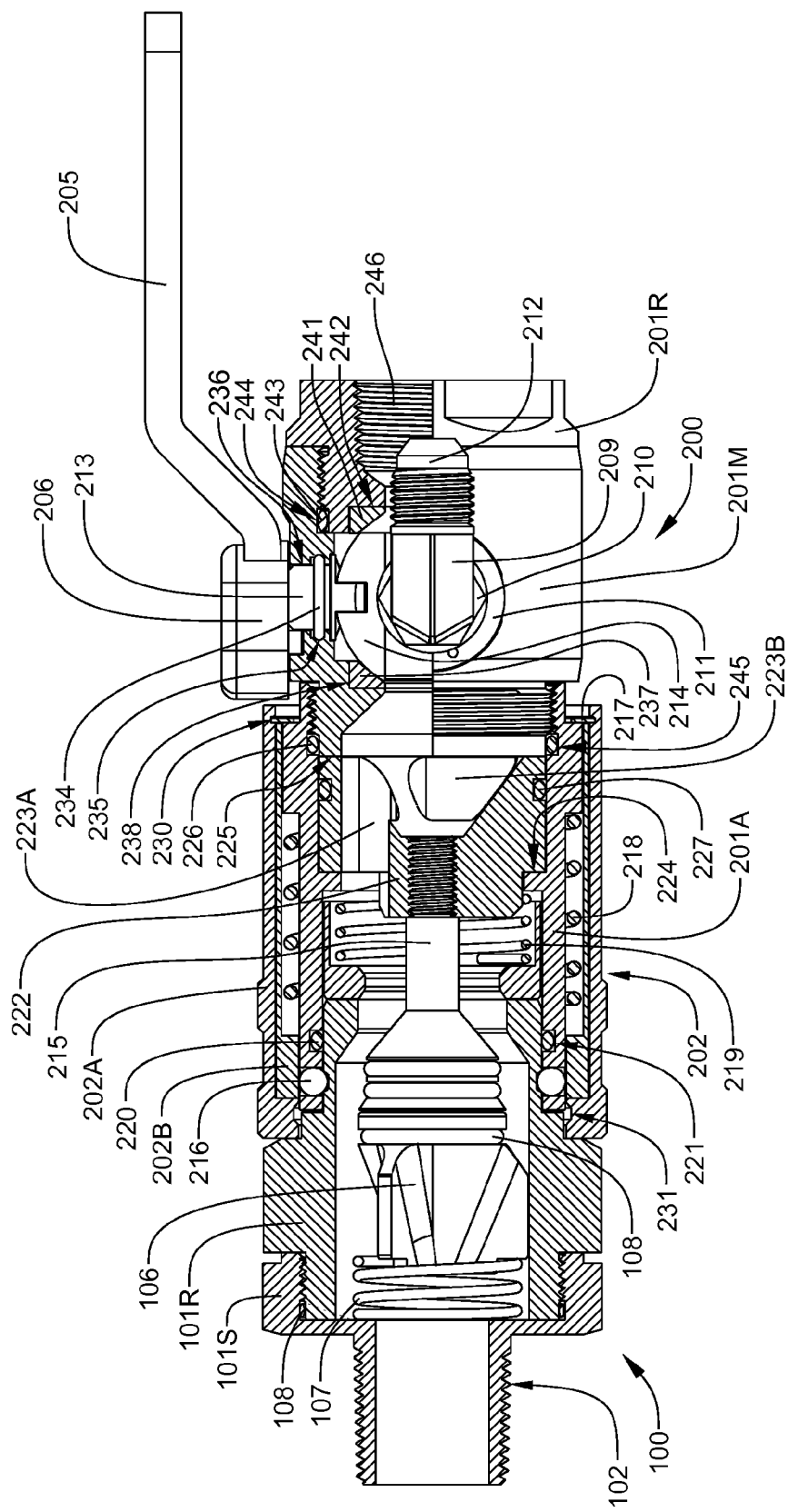
FIG. 8 is a cut-away/cross-sectional elevational view of the coupled grease coupler components of FIG. 1, with the cut taken through the central axes of the receiver and nozzle.

Referring now to FIGS. 7 and 8, the anterior body portion 201A of the nozzle 200 has been slid over the cylindrical receiving extension 103 of the receiver 100. As the anterior portion 101A slides over the cylindrical receiving extension 103, the slidable annular poppet seat 204 is urged rearward, thereby compressing the poppet seat biasing spring 218 and opening up a flow path through the nozzle. At the same time, the receiver poppet 106 is urged rearward into the receiving portion 101R of the receiver 100, thereby compressing the receiver poppet biasing spring 107, and opening up a flow path through the receiver 100. Once the steel latching balls 216 have engaged the annular circumferential locking groove 104, the locking collar 202 can be slid forward, thereby locking the steel latching balls 216 within the locking groove 104 and locking the nozzle 200 to the receiver 100. Forward movement of the locking collar 202 is limited by contact of the snap ring 216 with an annular flange 250 (see FIG. 6) of the anterior body portion 201A. After the locking collar 202 has been slid forward, sufficient clearance is provided between the rear edge 208 of the locking collar 202 and the interlock/rotation limiter 206 so that the latter can be rotated with the handle 205 through an arc of about 90 degrees. As the valve actuator shaft 213 is also coupled to the valve ball 214, it also rotates through an arc of about 90 degrees. A rotation limiter tab 251 on the interlock/rotation limiter 206 rides within an arcuate cutout (not shown in this view) in the middle body portion 201M, thereby limiting rotation of the interlock/rotation limiter 206 and coupled valve actuator shaft 213 and valve ball 214. With the handle 205 turned to the ON position, it will be noted that the major flow-through aperture 247 has been rotated so that grease can flow from the grease entrance port 246 and into the middle body portion 201M and into the anterior body portion 201A. The minor bleed-down aperture 248, which is now facing the side of the middle body portion 201M, is non functional when the handle 205 is in the ON position.

Still referring now to FIGS. 7 and 8, when a desired quantity of grease has been transferred through the nozzle 200 and into the receiver 100, the handle 205 can be turned to shut off the flow of grease, thereby also activating the bleed-down of pressurized grease or lubricating fluid within the anterior body portion 201A and middle body portion 201M through the minor bleed-down aperture 248, through the major flow-through aperture 247 and into the right angled fitting 209 and back into the grease or lubricating fluid supply tank. Once the handle 205 has been rotated to the OFF position, the nozzle 200 can be decoupled from the receiver 100.

FIGS. 9 through 16 are similar to FIGS. 1 through 8, respectively. The nozzle 200 is identical to those of FIGS. 1 through 8. The only difference is the second embodiment receiver 300, which has two poppets instead of the single poppet of the receiver 100.

Figure 9:
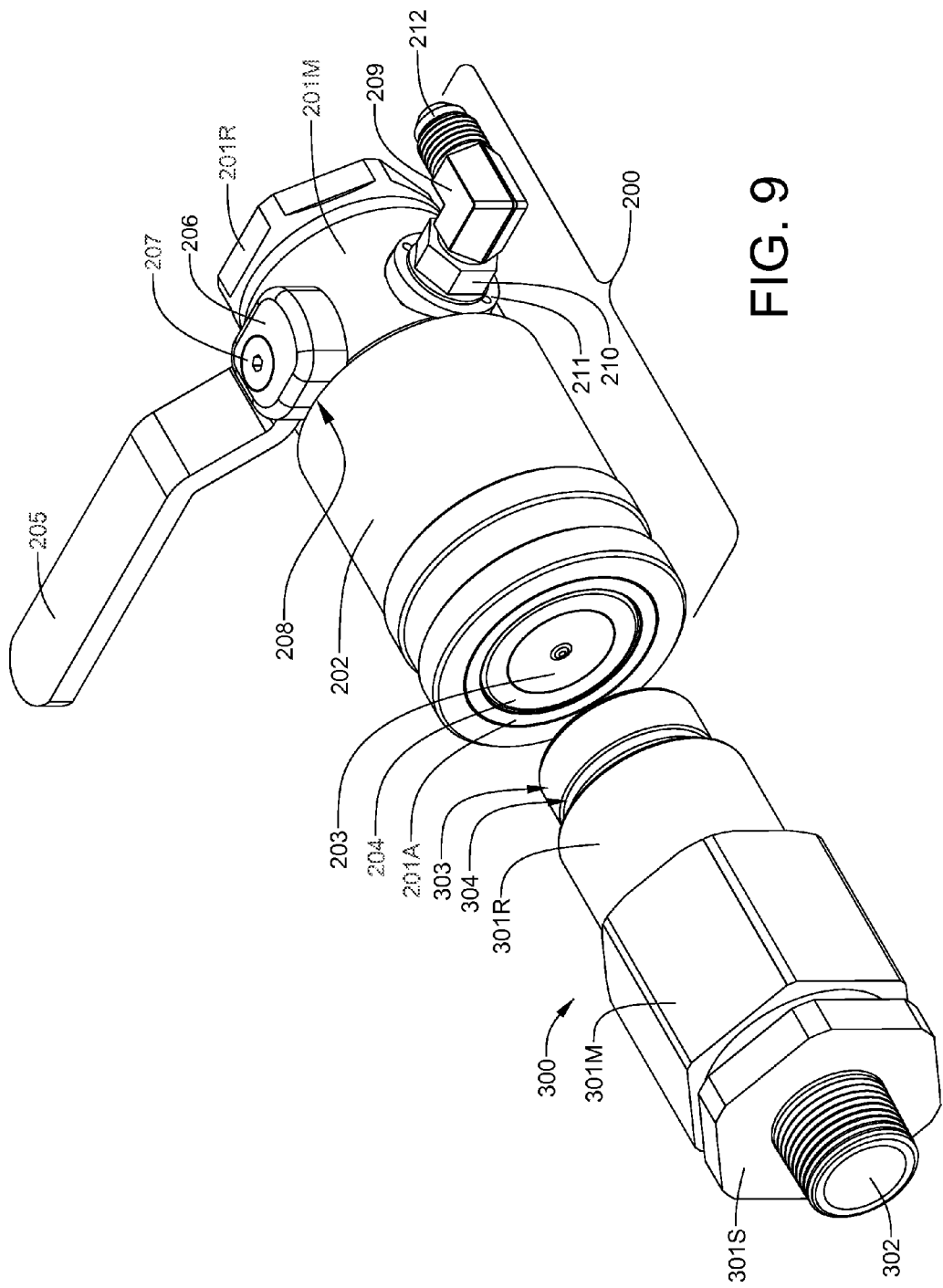
FIG. 9 is an isometric view of new grease coupler components, to wit, a tandem-poppet receiver and a nozzle having pressurization lockout and bleed-down capture, in an uncoupled configuration.
Figure 10:
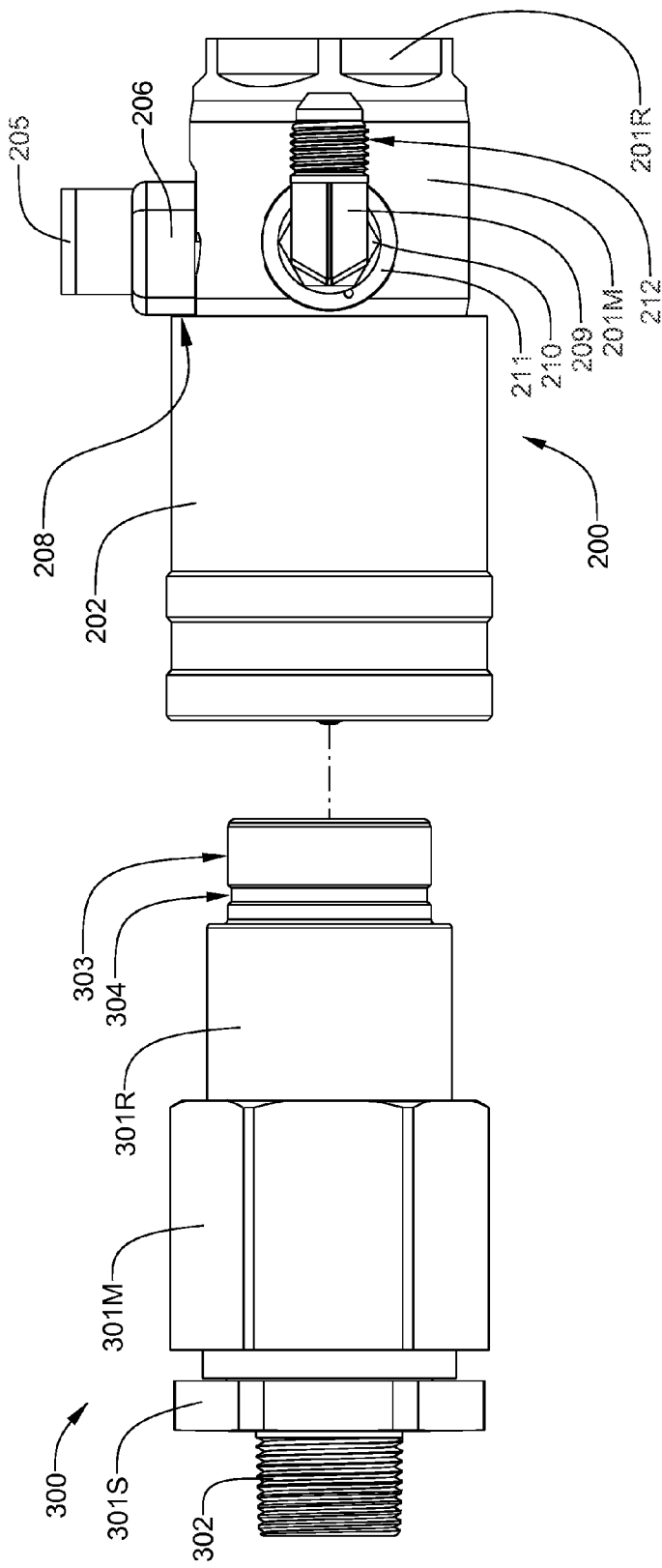
FIG. 10 is an elevational view of the new grease coupler components of FIG. 9, in an uncoupled configuration.

Referring now to FIGS. 9 and 10, the receiver 300 has a three-part body which includes a receiving portion 301R, a middle portion 301M, and a securing portion 101S. The securing portion 101S is equipped with a male pipe fitting 302 that can screwed into the female pipe fitting at the end of a high-pressure flexible hose, high-pressure metal line, or storage tank. The receiving portion 301R, like the receiving portion of receiver 100, has a cylindrical receiving extension 303, that is equipped with an annular circumferential locking groove 304, which enables the nozzle 200 to lock on to the cylindrical receiving extension 303. The securing portion 301S is threadably secured to the receiving portion middle portion 301M, which is in turn threadably secured to the receiving portion 301R. Together, the securing portion 301S, the middle portion 301M and the receiving portion 301R form a flow-through internal chamber. The exit 305 from the internal chamber passes through the male pipe fitting 302.

Figure 11:
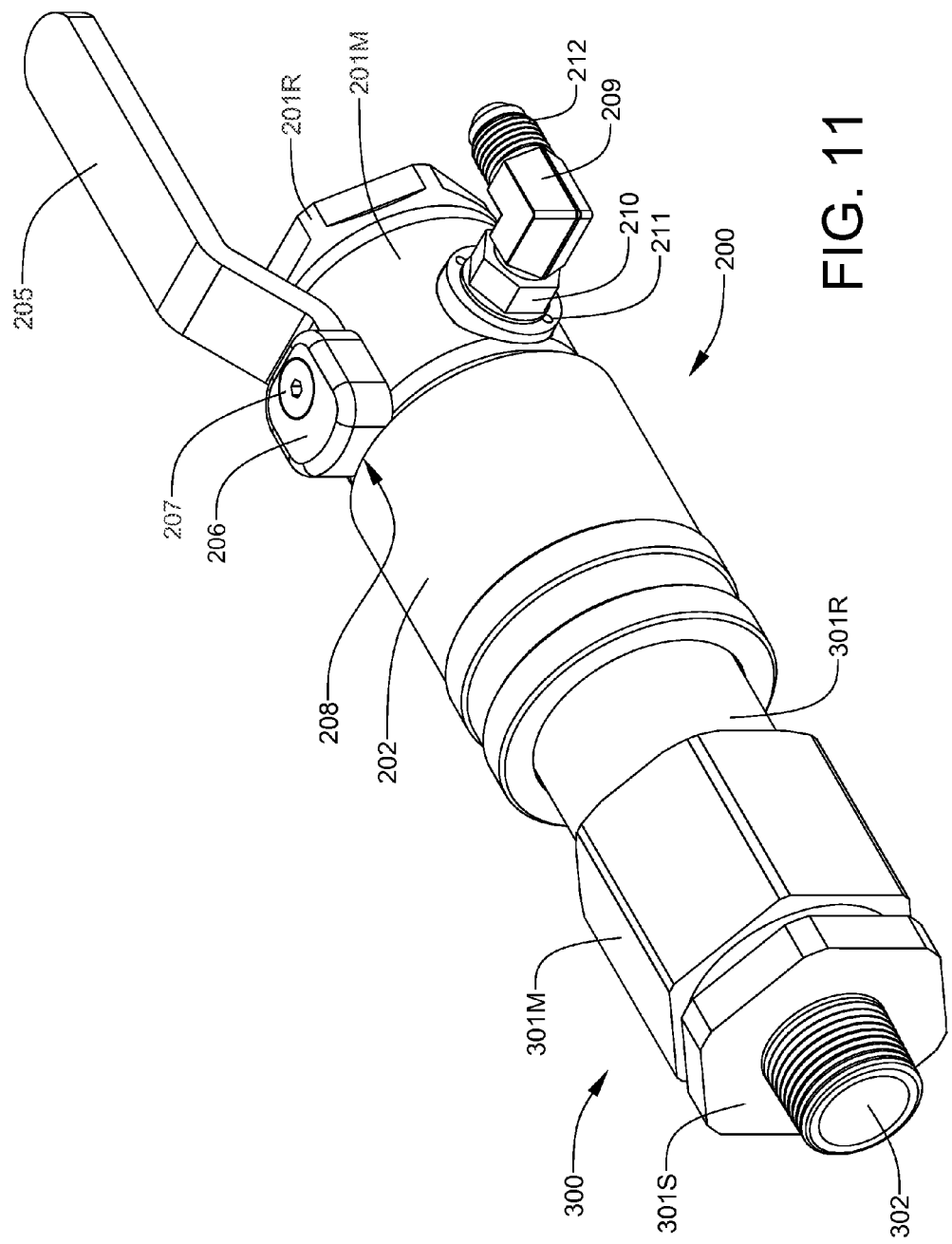
FIG. 11 is an isometric view of the new grease coupler components of FIG. 9 in a coupled configuration.
Figure 12:
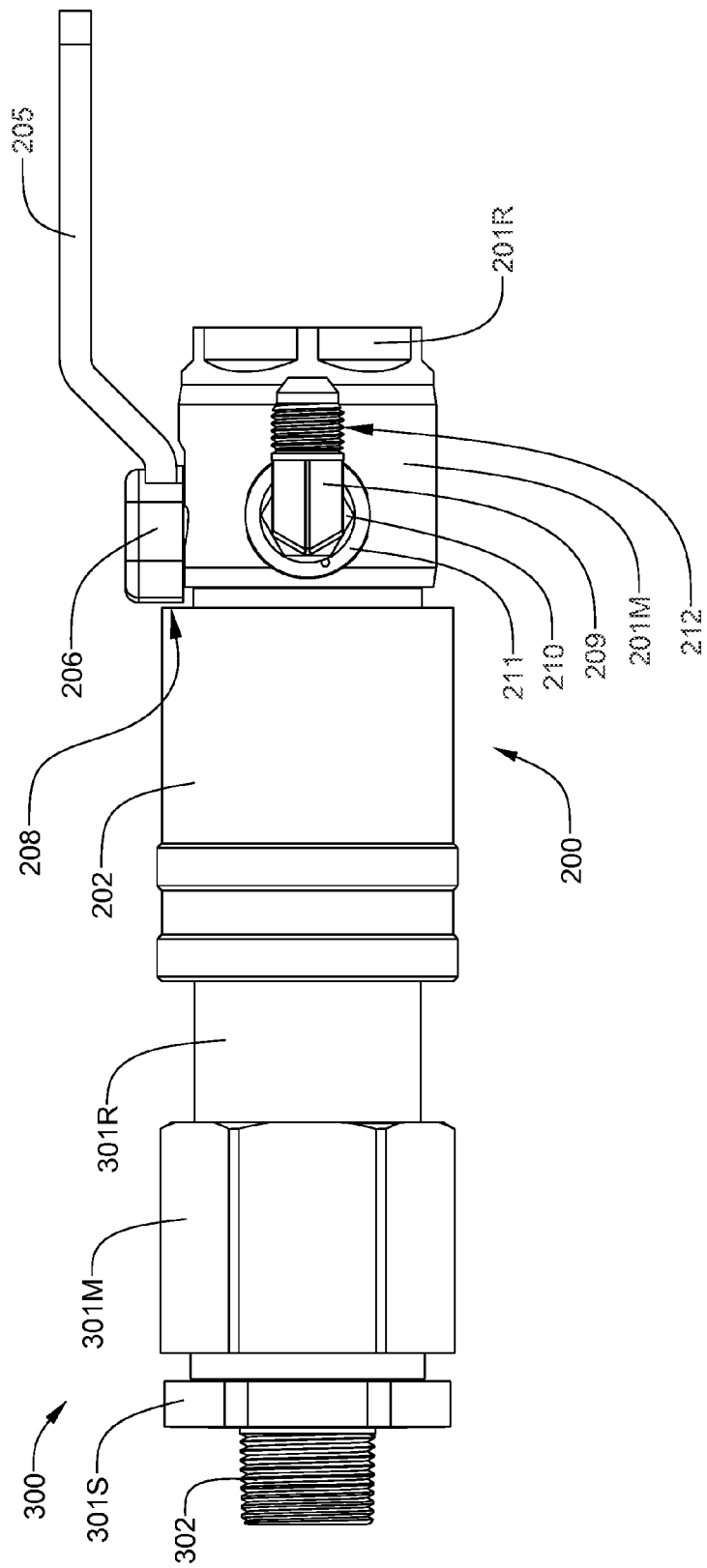
FIG. 12 is an elevational view of the new grease coupler components of FIG. 9, in a coupled configuration.

Referring now to FIGS. 11 and 12, coupling of the nozzle 200 to the second embodiment receiver 300 is accomplished in the identical manner as is the coupling of the nozzle 200 to the first embodiment receiver 100.

Figure 13:
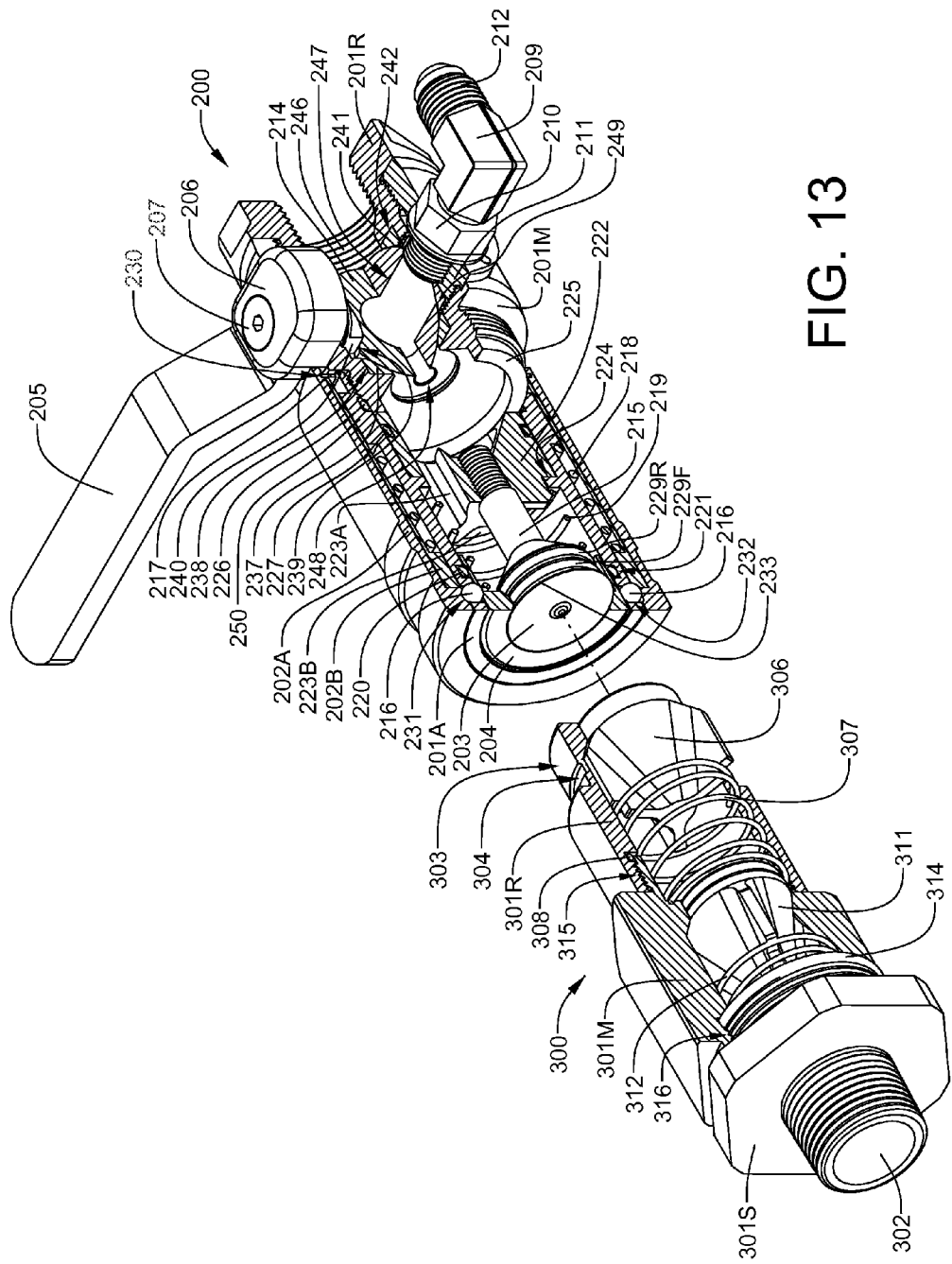
FIG. 13 is a cut-away/cross-sectional isometric view of the uncoupled grease coupler components of FIG. 9, with the cut taken through the central axes of the receiver and nozzle.
Figure 14:
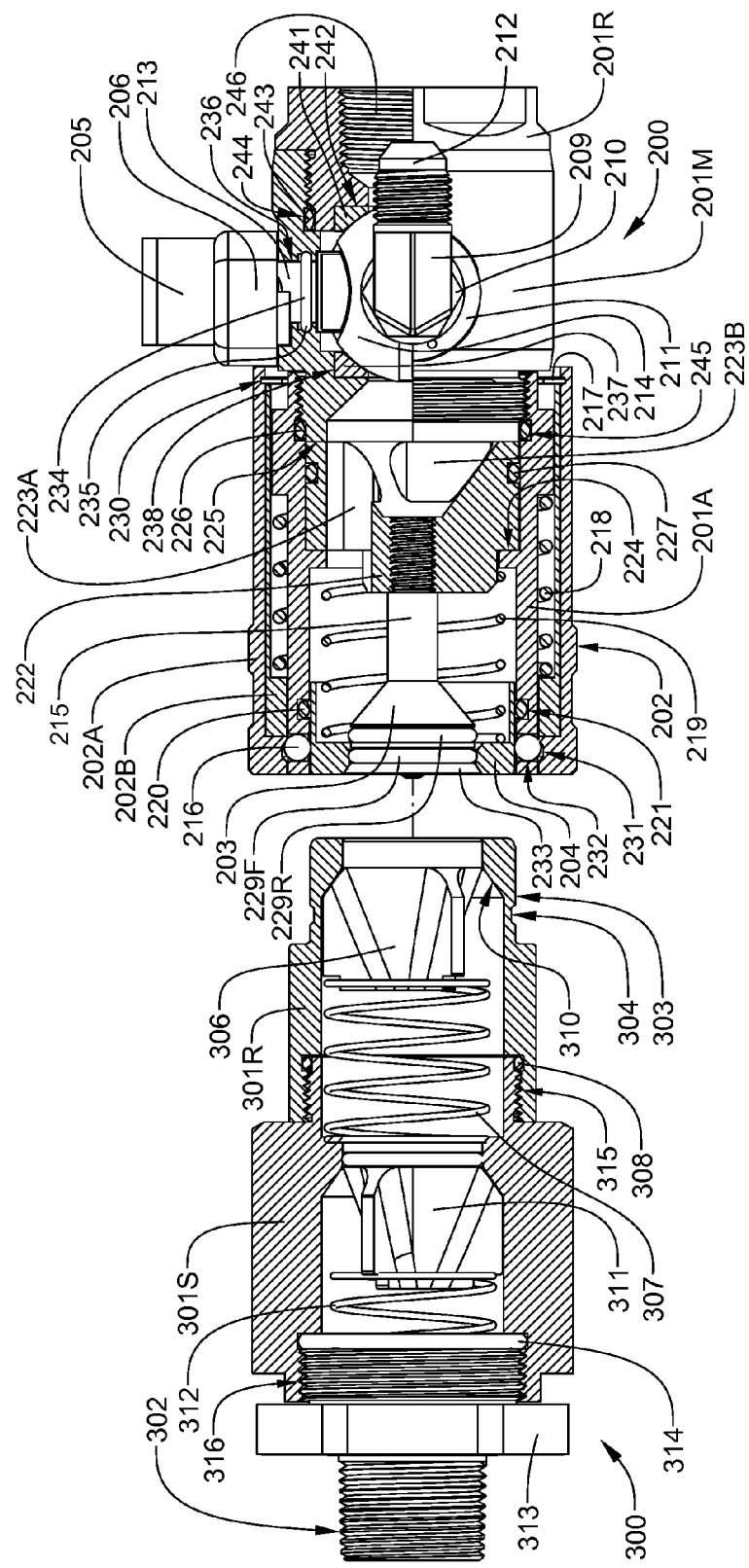
FIG. 14 is a cut-away/cross-sectional elevational view of the uncoupled grease coupler components of FIG. 9, with the cut taken through the central axes of the receiver and nozzle.

Referring now to FIGS. 13 and 14, when the receiver 300 is not coupled to the nozzle 200, flow through the internal chamber of receiver 300 is blocked by a first poppet 306 that is located at the receiving end of the receiver 300 and by a second poppet 311 that is positioned within the middle portion 301M of the receiver 300. The first poppet 306 functions just like the poppet 106 of the first receiver 100. Though both first and second poppets 306 and 311, respectively are both spring biased, the first poppet 306 is displaced by the nozzle poppet 203 when the nozzle 200 is coupled to the receiver 300. The second poppet 311, on the other hand, is displaced by the flow of grease or other lubricating fluid entering the receiver 300. The function of the second poppet 311 is to assist in the retention of internal fluid pressure in the machine or reservoir to which the receiver 300 is attached. It will be noted that the second poppet 311 is positioned entirely within the middle portion 301M of the receiver 300. It is biased by the second poppet biasing spring 312 to a normally-closed position. The second poppet of receiver 300 is equipped with a second poppet head O-ring 317 that seals the internal opening of the middle portion 301M when no grease is flowing through receiver 300 and the second poppet 311 is in its closed position. The flow of grease through the receiver 300 causes the second poppet 311 to open, thereby allowing grease or other lubricating fluid to pass through the receiver into grease or lubricant galleries of equipment to which the receiver 300 is attached or into a grease reservoir on the equipment. It will be further noted that the threaded joint 315 between the receiving portion 301R and the middle portion 301M is sealed with a front receiver O-ring 308. The threaded joint 316 between the middle portion 301M and the securing portion 301S is sealed with a rear receiver O-ring 316.

Figure 15:
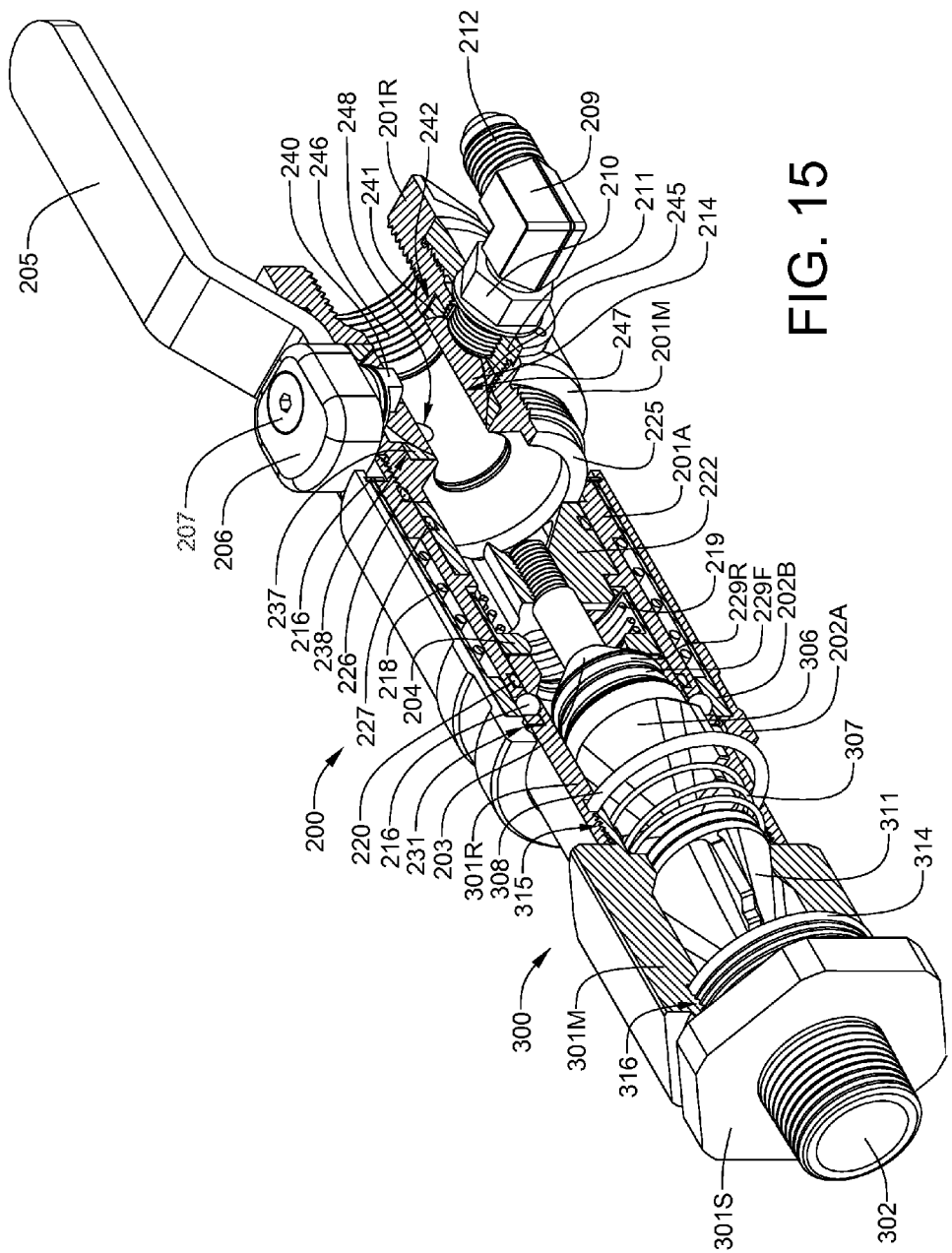
FIG. 15 is a cut-away/cross-sectional isometric view of the coupled grease coupler components of FIG. 9, with the cut taken through the central axes of the receiver and nozzle.
Figure 16:
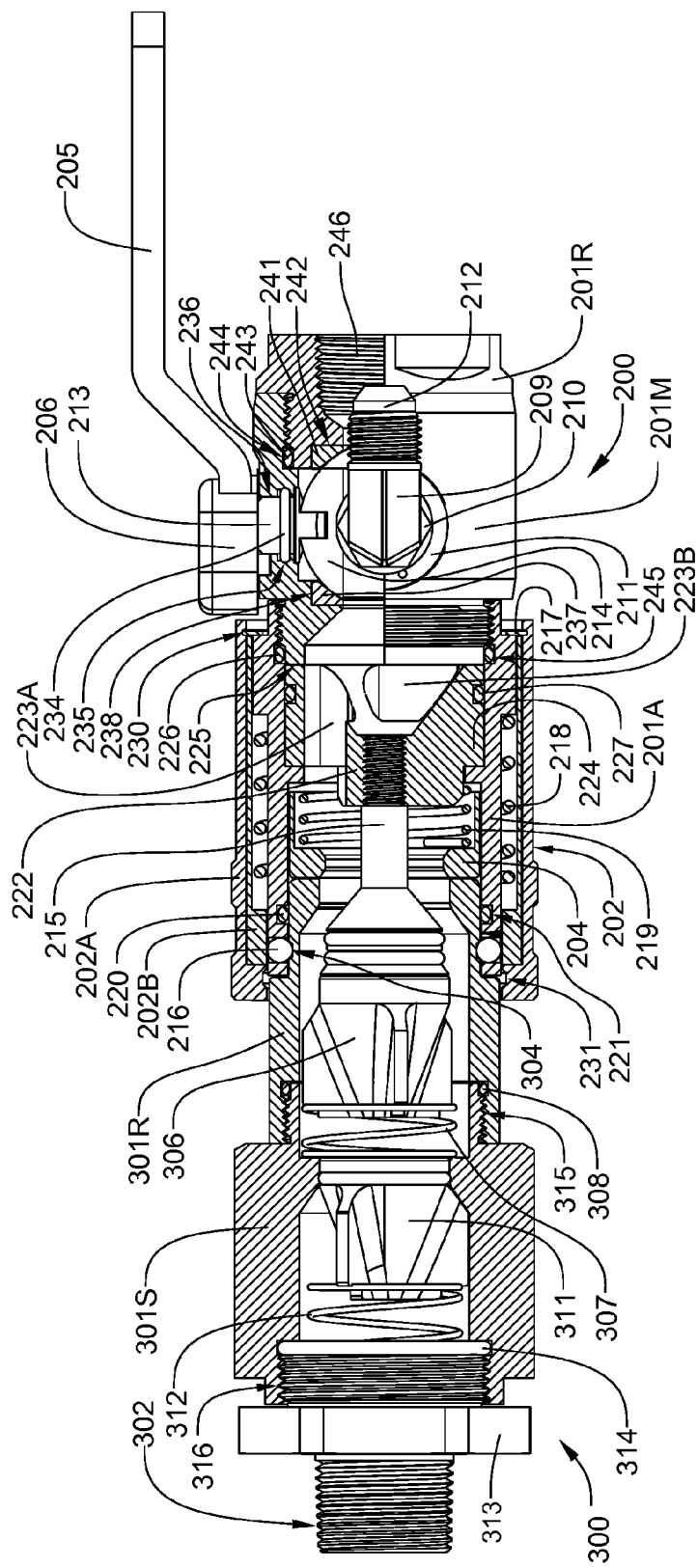
FIG. 16 is a cut-away/cross-sectional elevational view of the coupled grease coupler components of FIG. 9, with the cut taken through the central axes of the receiver and nozzle.

Referring now to FIGS. 15 and 16, the nozzle 200 is shown coupled to the second embodiment receiver 300. As previously stated, coupling of the nozzle 200 to the second embodiment receiver 300 is accomplished in a manner identical to that employed for the coupling of the nozzle 200 to the first embodiment receiver 100.

Referring now to FIGS. 17 through 21, a nozzle 400 having no a high-pressure bleed-down path is shown. Other than the absence of the right-angle hydraulic fitting 209, the cinch nut 210, the bleed-seal-tensioner insert 211, the minor bleed-down aperture 248 in the valve ball 214 (the valve ball without the bleed-down aperture 248 is item number 1801), and the side annular sealing ring 249, and a slightly different middle body portion 1701 (rather than 201M) that has no recess for the side annular sealing ring 249 and no threaded recess into which the bleed-seal-tensioner insert 211 is installed, the nozzles 200 and 400 are essentially identical.

Figure 22:
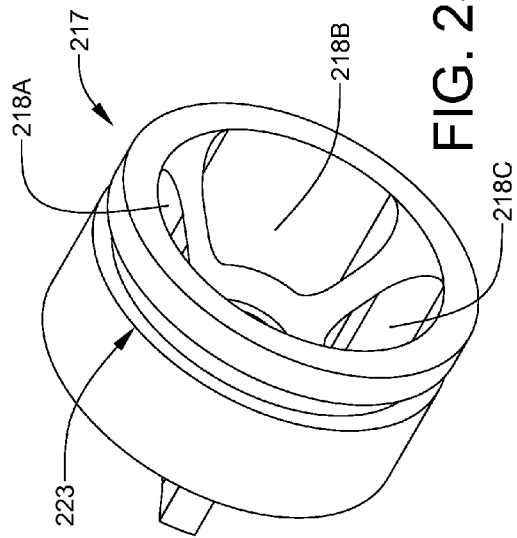
FIG. 22 is an enlarged isometric view of the spindle, showing primarily the front thereof.
Figure 23:
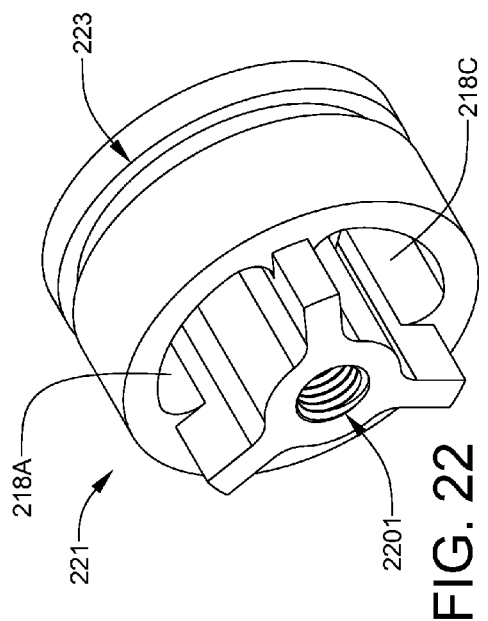
FIG. 23 is an enlarged isometric view of the spindle, showing primarily the rear thereof.

Referring now to FIGS. 22 and 23, these isometric views of spindle 222 enable a more thorough visualization of the component. The spindle has a threaded central aperture 2201, which the threaded end of the nozzle poppet shaft 215 engages. The spindle O-ring groove 228 is also visible on both of these views, as are all three flow-through passages 223A, 223B and 223C.

Figure 24:
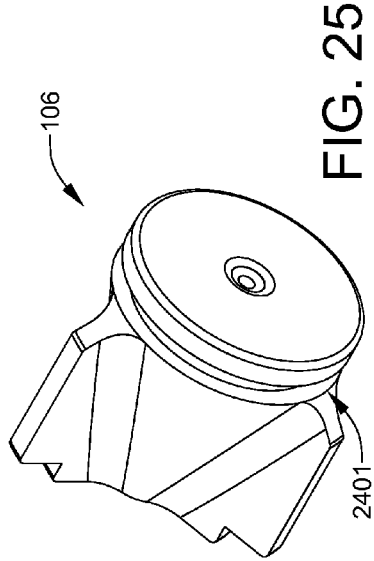
FIG. 24 is an enlarged isometric view of the receiver poppet, showing primarily the rear thereof.
Figure 25:
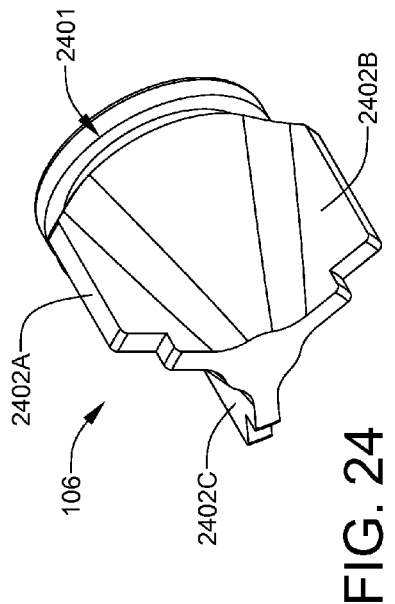
FIG. 25 is an enlarged isometric view of the receiver poppet, showing primarily the front thereof.

Referring now to FIGS. 24 and 25, these isometric view of the receiver poppet 106 enable a more thorough visualization of the component. The receiver poppet O-ring groove 2401, into which the receiver poppet O-ring 109 is installed, is clearly visible in these views. In addition, the receiver poppet 106 has three fins 2402A, 2402B and 2402C, which maintain the receiver poppet 106 in axial alignment within the receiver component of the receiver 100.

Although only a single embodiment of the invention is shown and described herein, it will be obvious to those having ordinary skill in the art that changes and modifications may be made thereto without departing from the scope and the spirit of the invention as hereinafter claimed.

What is claimed is:

1. A grease line coupler comprising:
    a receiver having a body with a cylindrical receiving extension, said receiving extension having an entrance opening, said receiving extension housing a slidable poppet that is spring biased toward said entrance opening so that said entrance opening is normally closed; and
    a nozzle having a generally hollow body with an exit opening, said body enclosing an immovable poppet that extends to the exit opening, said nozzle body also enclosing and surrounding a slidable, annular poppet seat that is spring-biased toward the exit opening so that it surrounds the immovable poppet, seals the exit opening, and forms, with the nozzle body and with the immovable poppet, an easily cleanable generally planar face when the nozzle is decoupled from said receiver, said body housing an internal ball valve that controls the flow of pressurized lubricating fluid through the nozzle, said ball valve coupled to a rotatable shaft to which an external handle is secured, said valve actuatable with said handle only when the nozzle exit opening is coupled to the receiver entrance opening, said nozzle also providing a bleed-off of high-pressure lubricant within the coupler to an external line when the handle of the nozzle is turned to its OFF position, but prior to decoupling the nozzle from the receiver;
    wherein the slidable receiver poppet and the receiver body form an easily-cleanable, generally flush face when the receiver is decoupled from the nozzle and the slidable poppet is biased to a forwardmost position so as to seal the entrance opening.

2. The grease line coupler of claim 1, wherein said receiver body incorporates a cylindrical receiving extension that houses a slidable poppet that is spring biased toward said entrance opening, and said nozzle has an immovable poppet and a slidable, spring-biased annular poppet seat which seals said exit opening when the nozzle is decoupled from said receiver.

3. The grease line coupler of claim 2, wherein the body of said nozzle comprises:
    an anterior body portion within which the immovable poppet is secured, and in which the annular poppet seat slides;
    a middle body portion which houses the ball valve and which is threadably secured to said anterior body portion; and
    a rear body portion threadably secured to said middle body portion, said rear body portion couplable to a grease line portion and functioning as a ball valve component retainer.

4. The grease line coupler of claim 3, wherein during an intercoupling of said nozzle with said receiver, said anterior body portion slides over the cylindrical receiving extension of said receiver body, with the fixed poppet of the nozzle depressing the receiver poppet so as to open a flow-through path within the receiver, and with said cylindrical receiving extension displacing said annular poppet seat so as to open a flow-through path through the anterior body portion.

5. The grease line coupler of claim 4, wherein the cylindrical receiving extension of said receiver incorporates an annular circumferential locking groove and the anterior body portion of said nozzle is equipped with a plurality of radially-spaced latching balls that are installed within latching ball apertures within the anterior body portion, said latching balls engaging the annular circumferential locking groove when said anterior body portion slides over the cylindrical receiving extension, said anterior body portion having a forward-biased slidable locking collar that slides forward to lock the latching balls into the annular circumferential locking groove once the latching balls have engaged the annular circumferential locking groove.

6. The grease line coupler of claim 5, wherein the nozzle further comprises a spindle that is secured in place within the anterior body portion by the middle body portion, said spindle having a central aperture within which the immovable poppet of the nozzle is secured.

7. The grease line coupler of claim 6, wherein said nozzle poppet comprises:
    a generally cylindrical poppet head having a tapered outer flange which limits forward travel of the annular poppet seat; and
    a poppet shaft rigidly affixed to the poppet head, said poppet shaft having a externally threaded end spaced from the poppet head that threadably engages the spindle's central aperture, which is internally threaded.

8. The grease line coupler of claim 5, which further comprises an eccentric interlock/rotation limiter that is secured to the rotatable shaft which operates the ball valve, said eccentric interlock/rotation limiter preventing the handle from being rotated when the nozzle is decoupled from the receiver and there exists insufficient clearance between a rear edge of the slidable locking collar and the interlock/rotation limiter.

9. The grease line coupler of claim 3 wherein:
    the slidable receiver poppet and the receiver body form an easily-cleanable, generally flush face when the receiver is decoupled from the nozzle and the slidable poppet is biased to a forwardmost position so as to seal the entrance opening; and
    the immovable poppet, the annular poppet seat, and the anterior body portion of the nozzle form an easily-cleanable, generally flush face when the nozzle is decoupled from the receiver and the annular poppet seat is biased to a forward most position so as to seal the exit opening.

10. The grease line coupler of claim 7, wherein:
    the slidable receiver poppet is equipped with an external O-ring, which contacts the receiver body, thereby sealing the entrance opening when the receiver is decoupled from the nozzle; and
    the nozzle poppet head is equipped with at least an external forward O-ring and said anterior body portion is equipped with an internal O-ring, said forward O-ring acting to seal a joint between the annular poppet seat and the poppet head, and said internal O-ring acting to seal a joint between the annular poppet seat and the anterior body portion when the nozzle is decoupled from the receiver and the annular poppet seat has been urged to its forwardmost position.

11. A grease line coupler comprising:
a receiver having a body with an entrance opening that is sealed by a spring-biased slidable poppet; and
a nozzle having a body with an exit opening, which is sealed by a spring-biased slidable annular poppet seat, that rides over an immovable central poppet, said nozzle also having a slidable locking collar that alternatively either latches in a rearward position when the nozzle is decoupled from the receiver or latches the nozzle to the receiver when the nozzle is coupled to the receiver, said body housing an internal ball valve that controls the flow of pressurized lubricating fluid through the nozzle, said ball valve coupled to a rotatable shaft to which an eccentric lockout and a handle are secured, said eccentric lockout preventing actuation of said ball valve when the nozzle is decoupled from the receiver and the locking collar is latched in the rearward position, said nozzle also providing a bleed-off of high-pressure lubricant within the coupler to an external line when the handle of the nozzle is turned to its OFF position, but prior to decoupling the nozzle from the receiver;
wherein the slidable receiver poppet and the receiver body form an easily-cleanable, generally flush face when the receiver is decoupled from the nozzle and the slidable poppet is biased to a forwardmost position so as to seal the entrance opening; and the immovable poppet, the annular poppet seat, and the anterior portion of the nozzle body form an easily-cleanable, generally flush face when the nozzle is decoupled from the receiver and the annular poppet seat is biased to a forwardmost position so as to seal the exit opening.

12. The grease line coupler of claim 11, wherein said high-pressure bleed-down path includes a minor bleed-down aperture that is transverse to and in communication with a major flow-through aperture within a ball of said ball valve, said minor bleed-down aperture transferring high-pressure excess lubricant within the nozzle body to the major flow-through aperture, through a hydraulic fitting secured within an aperture in a side of the nozzle body, and into the exterior bleed-down line.

13. The grease line coupler of claim 11, wherein said receiver body incorporates a cylindrical receiving extension, which houses the slidable poppet that is spring biased toward said entrance opening, and the body of said nozzle comprises an anterior body portion in which said immovable central poppet and said slidable annular poppet seat are installed, said anterior body portion sliding over the cylindrical receiving extension when the nozzle is coupled to the receiver, with the fixed poppet of the nozzle thereby depressing the receiver poppet so as to open a flow-through path within the receiver, and with said cylindrical receiving extension displacing said annular poppet seat so as to open a flow-through path through the anterior body portion.

14. The grease line coupler of claim 13, wherein the body of said nozzle further comprises:
a middle body portion which houses the ball valve and which is threadably secured to said anterior body portion; and
a rear body portion threadably secured to said middle body portion, said rear body portion couplable to a grease line and functioning as a ball valve component retainer.

15. The grease line coupler of claim 14, wherein the cylindrical receiving extension of said receiver incorporates an annular circumferential locking groove and the anterior body portion of said nozzle is equipped with a plurality of radially-spaced latching balls that are installed within latching ball apertures within the anterior body portion, said latching balls engaging the annular circumferential locking groove when said anterior body portion slides over the cylindrical receiving extension, said anterior body portion having a forward-biased slidable locking collar that slides forward to lock the latching balls into the annular circumferential locking groove once the latching balls have engaged the annular circumferential locking groove.

16. The grease line coupler of claim 15, wherein the nozzle further comprises a spindle that is secured in place within the anterior body portion by the middle body portion, said spindle having a central aperture within which the immovable poppet of the nozzle is secured.

17. The grease line coupler of claim 16, wherein said nozzle poppet comprises:
a generally cylindrical poppet head having a tapered outer flange which limits forward travel of the annular poppet seat; and
a poppet shaft rigidly affixed to the poppet head, said poppet shaft having a externally threaded end spaced from the poppet head that threadably engages the spindle's central aperture, which is internally threaded.

18. The grease line coupler of claim 15, which further comprises an eccentric interlock/rotation limiter that is secured to the rotatable shaft which operates the ball valve, said eccentric interlock/rotation limiter preventing the handle from being rotated when the nozzle is decoupled from the receiver and there exists insufficient clearance between a rear edge of the slidable locking collar and the interlock/rotation limiter.

19. The grease line coupler of claim 13 wherein:
the slidable receiver poppet and the receiver body form an easily-cleanable, generally flush face when the receiver is decoupled from the nozzle and the slidable poppet is biased to a forwardmost position so as to seal the entrance opening; and
the immovable poppet, the annular poppet seat, and the anterior body portion of the nozzle form an easily-cleanable, generally flush face when the nozzle is decoupled from the receiver and the annular poppet seat is biased to a forward most position so as to seal the exit opening.

20. The grease line coupler of claim 17, wherein:
the slidable receiver poppet is equipped with an external O-ring, which contacts the receiver body, thereby sealing the entrance opening when the receiver is decoupled from the nozzle; and
the nozzle poppet head is equipped with at least an external forward O-ring and said anterior body portion is equipped with an internal O-ring, said forward O-ring acting to seal a joint between the annular poppet seat and the poppet head, and said internal O-ring acting to seal a joint between the annular poppet seat and the anterior body portion when the nozzle is decoupled from the receiver and the annular poppet seat has been urged to its forwardmost position.

* * * * *